US012576849B2

(12) United States Patent
Keller

(10) Patent No.: US 12,576,849 B2
(45) Date of Patent: *Mar. 17, 2026

(54) SYSTEMS AND METHODS FOR PROVIDING A VEHICLE WITH A TORQUE VECTORED K-TURN MODE

(71) Applicant: Rivian IP Holdings, LLC, Plymouth, MI (US)

(72) Inventor: Lucas Keller, Farmington Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/113,995

(22) Filed: Feb. 24, 2023

(65) Prior Publication Data

US 2023/0271612 A1     Aug. 31, 2023

Related U.S. Application Data

(63) Continuation of application No. 16/731,685, filed on Dec. 31, 2019, now Pat. No. 11,590,977.

(51) Int. Cl.
B60K 1/02 (2006.01)
B60K 5/08 (2006.01)
(Continued)

(52) U.S. Cl.
CPC ......... B60W 30/18145 (2013.01); B60K 1/02 (2013.01); B60K 5/08 (2013.01);
(Continued)

(58) Field of Classification Search
CPC ......... B60W 30/18145; B60W 10/119; B60W 10/184; B60W 2720/403;
(Continued)

(56) References Cited

U.S. PATENT DOCUMENTS 5,924,512 A     7/1999   Wada
6,588,858 B2    7/2003   Ritz et al.
(Continued)

FOREIGN PATENT DOCUMENTS

CN          101557958 A     10/2009
CN          101638052 A     2/2010
(Continued)

OTHER PUBLICATIONS

NTN "Development of "Two Motor On-board Drive System" for Next-generation EV", 10/15, p. 1 (Year: 2015).*
(Continued)

*Primary Examiner* — Adam D Tissot
*Assistant Examiner* — Charles Pall
(74) *Attorney, Agent, or Firm* — HG LAW LLP

(57)          ABSTRACT

Systems and methods are provided herein for operating a vehicle in a K-turn mode. The K-turn mode is engaged in response to determining that an amount that at least one of the front wheels of the vehicle is turned exceeds a turn threshold. While operating in the K-turn mode, forward torque is provided to the front wheels of the vehicle. Further, backward torque is provided to the rear wheels of the vehicle. Yet further, the rear wheels of the vehicle remain substantially in static contact with a ground while the front wheels slip in relation to the ground.

20 Claims, 12 Drawing Sheets

(51) Int. Cl.

| | | |
|---|---|---|
| *B60K 17/16* | (2006.01) | |
| *B60W 10/119* | (2012.01) | |
| *B60W 10/184* | (2012.01) | |
| *B60W 30/18* | (2012.01) | |
| *B62D 6/00* | (2006.01) | |

(52) U.S. Cl.
CPC ........... *B60K 17/16* (2013.01); *B60W 10/119* (2013.01); *B60W 10/184* (2013.01); *B62D 6/00* (2013.01); *B60W 2720/403* (2013.01); *B60W 2720/406* (2013.01)

(58) Field of Classification Search
CPC ....... B60W 2720/406; B60W 2720/40; B60W 30/045; B60K 1/02; B60K 5/00; B60K 17/16; B60K 1/00; B60K 7/0007; B60K 17/354; B60K 17/356; B60K 2001/001; B60K 2007/0046; B60K 2007/0061; B62D 6/00; B62D 15/00
USPC .......................................................... 701/41
See application file for complete search history.

(56) References Cited

U.S. PATENT DOCUMENTS

| | | | |
|---|---|---|---|
| 7,386,379 B2 | 6/2008 | Naik et al. | |
| 8,849,537 B2* | 9/2014 | Yoon ................... | B60W 10/184 |
| | | | 701/1 |
| 9,950,703 B2 | 4/2018 | Lee et al. | |
| 10,654,470 B2 | 5/2020 | Sato | |
| 10,730,477 B2* | 8/2020 | Kumazaki ............ | B60R 25/241 |
| 2008/0183353 A1 | 7/2008 | Post et al. | |
| 2009/0005931 A1 | 1/2009 | Komatsu | |
| 2013/0274055 A1 | 10/2013 | Horaguchi et al. | |
| 2014/0132405 A1* | 5/2014 | Kiefer ................... | B60Q 9/008 |
| | | | 340/438 |
| 2014/0228167 A1* | 8/2014 | Frank ................... | B60K 6/442 |
| | | | 180/65.265 |

| | | | |
|---|---|---|---|
| 2014/0267263 A1* | 9/2014 | Beckwith ............... | G06T 15/08 |
| | | | 345/424 |
| 2015/0065293 A1 | 3/2015 | Ando et al. | |
| 2015/0283918 A1 | 10/2015 | Honda et al. | |
| 2016/0280259 A1 | 9/2016 | Ishikawa et al. | |
| 2016/0318509 A1 | 11/2016 | Rycroft | |
| 2017/0144702 A1* | 5/2017 | Dang ..................... | B62D 6/001 |
| 2017/0232848 A1* | 8/2017 | Lian ................ | B60W 30/18172 |
| | | | 701/22 |
| 2017/0253144 A1 | 9/2017 | Arima et al. | |
| 2018/0086374 A1* | 3/2018 | Sato ......................... | B62D 6/10 |
| 2018/0178610 A1* | 6/2018 | Fujita ................ | B60G 21/0555 |
| 2018/0312081 A1 | 11/2018 | Hancock et al. | |
| 2019/0176618 A1* | 6/2019 | Bassis ...................... | B60K 1/02 |
| 2019/0176801 A1 | 6/2019 | Ruybal et al. | |
| 2019/0176812 A1* | 6/2019 | Hirata ................. | B60W 30/045 |
| 2019/0263409 A1 | 8/2019 | Yasutomi | |
| 2019/0272450 A1* | 9/2019 | Ambeck-Madsen ....................... | |
| | | | G06V 10/454 |
| 2020/0148255 A1 | 5/2020 | Korsch et al. | |
| 2020/0269849 A1* | 8/2020 | Kang ................... | G06V 20/597 |
| 2020/0376958 A1* | 12/2020 | Ono ........................ | B60K 17/22 |
| 2021/0195834 A1* | 7/2021 | Arendt ................. | G05D 1/0236 |
| 2022/0109705 A1* | 4/2022 | Verbeke .............. | H04L 65/1083 |
| 2022/0121867 A1* | 4/2022 | Arar .................. | B60W 30/0956 |

FOREIGN PATENT DOCUMENTS

| | | | |
|---|---|---|---|
| CN | 106553688 A | | 4/2017 |
| CN | 107776663 A | | 3/2018 |
| JP | 2018052164 A | * | 4/2018 |

OTHER PUBLICATIONS

NTN "Development of "Two Motor On-board Drive System" for Next-generation EV", Oct. 15, p. 1. (Year: 2015).*
English translation of JP-2018052164-A (Year: 2025).*
https://ieeexplore.ieee.org/stamp/stamp.jsp?tp=&arnumber=4621302 Classifying Ego-Vehicle Road Maneuvers from Dashcam Video (Year: 2019).

* cited by examiner

<u>100</u>

$$F_{F1}+F_{F2} \approx F_{R1}+F_{R2}$$

Normal Driving Mode
502

Turn Threshold
504

K-Turn Mode
506

600

Determine Turning Amount of the Front Wheels

602

Turn Amount Exceeds a Turn Threshold?

604

No

Yes

Engage K-turn Mode

606

Provide Backwards Torque to the Rear Wheels of the Vehicle

608

Provide Forward Torque to the Front Wheels of the Vehicle

610

Monitor Turn Angel of the vehicle

612

Turn Amount Is Below a Threshold?

614

No

Yes

Disengage K-turn Mode

616

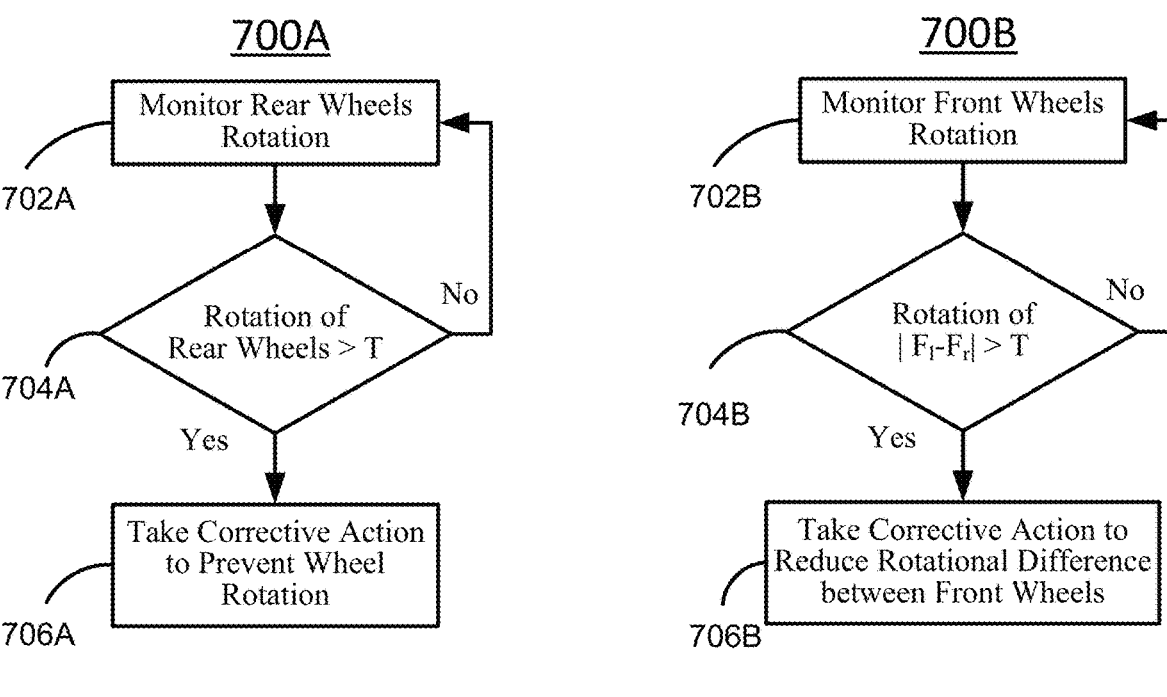

700A

Monitor Rear Wheels Rotation

702A

Rotation of Rear Wheels > T

No

704A

Yes

Take Corrective Action to Prevent Wheel Rotation

Monitor Front Wheels Rotation

702B

Rotation of | F$_l$-F$_r$| > T

No

704B

Yes

Take Corrective Action to Reduce Rotational Difference between Front Wheels

Monitor Throttle Input

702C

Monitor Rotational Information of the Vehicle

704C

Control Backward Torque to the Rear Wheels and Forward Torque to the Front Wheels Based on the Rotational Information and Throttle Input

Normal Driving Mode
1002

Lower Turn Threshold
1004

Front Dig Mode
1006

Turn Threshold
1008

K-Turn Mode
1010

1200

SYSTEMS AND METHODS FOR PROVIDING A VEHICLE WITH A TORQUE VECTORED K-TURN MODE

CROSS-REFERENCE TO RELATED APPLICATION

This application is a continuation of U.S. patent application Ser. No. 16/731,685, filed Dec. 31, 2019, the disclosures of which is hereby incorporated by reference herein in its entirety.

INTRODUCTION

Modern vehicles generally perform turns by allowing the driver to turn the front wheels of the vehicle (e.g., by turning the steering wheel) and applying torque to at least two wheels (e.g., in response to the user pressing an accelerator pedal). However, such turns typically have a relatively large turn radius defined by the layout of the wheels and how far the wheels can turn. Such turns do not allow for navigation of tight corners. Consequently, what is needed is improved turning capability that enable turns with decreased turn radius.

Some vehicles are able to perform turns with decreased radius by providing forward torque to wheels on one side of the vehicle and by providing backward torque to wheels on the other side of the vehicle with all of the wheels pointed straight ahead, which allows the vehicle to rotate. However, such a turn when employed on soft surfaces can cause the wheels to dig into the ground and sink rather than turning the vehicle. Therefore, in some embodiments, what is needed is improved turning capability that enable turns with decreased turn radius without the wheels of the vehicle sinking into the ground.

SUMMARY

In accordance with the present disclosure, systems and methods are provided that improve the operation of a vehicle by providing a K-turn mode to allow the vehicle to achieve a significantly reduced turn radius (e.g., the vehicle may pivot around a point under the chassis of the vehicle). For example, a method may utilize improved features of a vehicle (e.g., independent controls of front and back drive shafts, independent controls of the wheels, independent controls of the brakes, etc.) to provide a vehicle with a capability of performing turns with a significantly reduced turn radius. A K-turn can be used in any vehicle capable of distributing torque and/or braking to the wheels of the vehicle.

In some implementations, techniques described below may be performed by processing circuitry of a vehicle. The processing circuitry may be implemented as a part of a vehicle. In some embodiments, the processing circuitry may comprise an on-board vehicle computer that can control multiple features or capabilities of the vehicle. In some embodiments, the processing circuitry may be communicatively connected with user inputs of the vehicle, sensors of the vehicle, and transitory or non-transitory memory (e.g., memory-storing institutions for operating the vehicle).

In some embodiments, a method for turning a vehicle in a K-turn mode is provided. For example, the processing circuitry may engage the K-turn of the vehicle under certain circumstances. In some embodiments, the processing circuitry may engage the K-turn mode after the user issues a command requesting such mode (e.g., by pressing an approximate button, turning the steering wheel past a certain point, or via any other input).

In some embodiments, the processing circuitry may engage the K-turn mode when an amount that the front wheels of the vehicle are turned exceeds a turn threshold (e.g., by determining a turn angle of the front wheels). For example, the processing circuitry may determine that the amount that the front wheels of the vehicle is turned exceeds a turn threshold (e.g., 75%, 70%, or any other turn threshold). In some embodiments, when the criterion is met, the processing circuitry may engage the K-turn mode.

In some embodiments, while operating in K-turn mode, the processing circuitry may provide forward torque to the front wheels of the vehicle. In some embodiments, forward torque may be provided in proportion to the user input (e.g., proportionally to how far the user has pressed the accelerator pedal). In some embodiments, the processing circuitry may also provide backward torque to the rear wheels of the vehicle. For example, the processing circuitry may concurrently provide forward torque to the front wheels of the vehicle and provide backward torque to the rear wheels of the vehicle of the vehicle. As a result of operating in the K-turn mode, the vehicle will perform a turn with a significantly reduced turn radius. In some embodiments, as a result of operating in the K-turn mode, the vehicle will perform a turn by pivoting around a point under the chassis of the vehicle.

In some embodiments, the processing circuitry, when providing backward torque to the rear wheels, may provide backward torque to an inner rear wheel of the vehicle. In some embodiments, the processing circuitry may provide backward torque to an outer rear wheel of the vehicle. For example, the processing circuitry may concurrently provide backward torques to the outer rear wheel and the inner rear wheel of the vehicle. In some embodiments, while operating in the K-turn mode, the rear wheels of the vehicle are substantially in static contact with a ground.

In some embodiments, the processing circuitry may monitor rotation of each of the rear wheels. For example, the processing circuitry may monitor for rear wheel slip in at least one of the rear wheels of the vehicle. In some embodiments, while operating in the K-turn mode, the processing circuitry, in response to identifying rear wheel slip in at least one of the rear wheels of the vehicle, may apply a corrective action to the rear wheel exhibiting slip. In some embodiments, the corrective action to the rear wheel exhibiting slippage may apply a brake to the rear wheels. In some embodiments, the corrective action may reduce backward torque to the rear wheels. For example, the processing circuitry, in response to determining that at least one of the rear wheels is slipping, may apply a brake to the rear wheel to stop the rear wheel from slipping or may reduce the backward torque to the rear wheel slipping.

In some embodiments, the processing circuitry when providing forward torque to the front wheels may provide forward torque to an inner front wheel of the vehicle and an outer front wheel of the vehicle. For example, the processing circuitry may concurrently provide forward torques to the outer front wheel and the inner front wheel of the vehicle. In some embodiments, while operating in the K-turn mode, the front wheels of the vehicle may slip relative to the ground.

In some embodiments, the processing circuitry may monitor rotation of the inner front wheel and the outer front wheel. For example, the processing circuitry may monitor the rotation of the inner front wheel and the rotation of the outer front wheel as both front wheels slip relative to the ground. In some embodiments, while operating in the K-turn mode, the processing circuitry may control the forward torque of the front wheels such that the rotation of the inner front wheel is approximately equal to the rotation of the outer front wheel. For example, the processing circuitry in response to determining that the rotation of the inner front wheel is not approximately equal to the rotation of the outer front wheel, may control the rotation of each of the front wheels such that the rotation of the inner front wheel is approximately equal to the rotation of the outer front wheel. In some embodiments, the processing circuitry may apply a brake to the front wheels. In some embodiments, the processing circuitry may reduce forward torque to the front wheels.

In some embodiments, the processing circuitry may compare the rotation of the inner front wheel and the outer front wheel to a target spin rate (e.g., 4 revolutions per second spin rate or any other spin rate). For example, the processing circuitry may control the rotation of the inner front wheel and the rotation of the outer front wheel based on the comparison to the target spin rate. In some embodiments, while operating in the K-turn mode, the processing circuitry may control the forward torque of the front wheels such that the rotation of the inner front wheel and the rotation of the outer front wheel does not exceed the target spin rate. For example, the processing circuitry in response to determining that the rotation of the inner front wheel or the rotation of the outer front wheel is above the target spin rate, may control the forward torque to the front wheels of the vehicle based on the determination to prevent tire and drivetrain wear. In some embodiments, the processing circuitry may apply a brake to the front wheels. In some embodiments, the processing circuitry may reduce forward torque to the front wheels.

In some embodiments, the forward torques may cause front forces to be exerted on the ground by the front wheels. For example, the front forces may include forward force components and lateral force components. According to another example, the backward torques cause rearward force components to be exerted on the ground by the rear wheels. In some embodiments, a sum of the forward force components is substantially equal to a sum of the rearward force components. According to an implementation of this embodiment, the lateral force components may act on the front wheels.

In some embodiments, the processing circuitry may receive rotation information of the vehicle from at least one sensor. In some embodiments, the processing circuitry may also receive a throttle input (e.g., in response to the user pressing an accelerator pedal). In some embodiments, while operating in the K-turn mode, the processing circuitry may control the forward torque to the front wheels of the vehicle and the backward torque to the rear wheels of the vehicle based on the rotation information and the throttle input. For example, the processing circuitry may receive rotation information of the vehicle indicating that the vehicle is turning. In some examples, the processing circuitry may also receive throttle input and based on receiving this information, the processing circuitry may control the forward torque to the front wheels of the vehicle and the backward torque to the rear wheels of the vehicle.

In some embodiments, forward torque is provided using a first motor mechanically coupled to the front wheels via a first differential (e.g., a locking differential, a limited slip differential, an electronically controlled differential, or any other torque splitting device). In some embodiments, backward torque is provided to the rear wheels using a second motor mechanically coupled to the rear wheels via a second differential (e.g., a locking differential, a limited slip differential, an electronically controlled differential, or any other torque splitting device).

In some embodiments, backward torque is provided to an outer rear wheel of the vehicle using a first motor coupled to the outer rear wheel via a first gearbox and backward torque is provided to an inner rear wheel of the vehicle using a second motor coupled to the inner rear wheel via a second gearbox.

In some embodiments, forward torque is provided to the front wheels by a first motor configured to transmit torque to an outer front wheel and a second motor configured to transmit torque to an inner front wheel. In some embodiments, backward torque is provided to the rear wheels by a third motor configured to transmit torque to an outer rear wheel and a fourth motor configured to transmit torque to an inner rear wheel.

In some embodiments, the processing circuitry may be configured to disengage the K-turn mode. For example, the processing circuitry may determine that the amount that the front wheels of the vehicle is turned is below the turn threshold. In some embodiments, when the determination is made, the processing circuitry may automatically disengage the K-turn mode. In some embodiments, the processing circuitry may disengage the K-turn mode in response to receiving user input (e.g., a key being pressed, or the steering wheel being turned to a position that does not exceed a threshold).

In some embodiments, the processing circuitry may also be configured to engage a front dig mode. For example, the processing circuitry may determine that the amount that the front wheels of the vehicle is turned is between the turn threshold for the K-turn mode and a lower turn threshold. In some embodiments, when the determination is made that the amount that the front wheels of the vehicle is turned is between the turn threshold and the lower turn threshold, the processing circuitry may be configured to engage a front dig mode. In some embodiments, while operating in the front dig mode, the processing circuitry may provide forward torque to the front wheels of the vehicle. In some embodiments, forward torque may be provided in proportion to the user input (e.g., proportionally to how far the user has pressed the accelerator pedal). In some embodiments, the processing circuitry may also apply resistance to forward rotation of the inner rear wheel of the vehicle. For example, the processing circuitry may engage a brake connected to the inner rear wheel of the vehicle. In another example, the processing circuitry may provide backward torque to the inner rear wheel of the vehicle. In some embodiments, the processing circuitry may also provide forward torque to the outer rear wheel of the vehicle. As a result of operating in the front dig mode, the vehicle will perform a turn with a reduced turn radius that may be between the turn radius of a regular non-slipping turn mode and the turn radius of the K-turn mode.

According to another embodiment, a vehicle configured for turning in a K-turn mode is provided. In some embodiments, the vehicle may be configured to include front wheels and at least one first motor configured to provide torque to the front wheels. In some embodiments, the vehicle may be configured to include rear wheels and at least one second motor configured to provide torque to the rear wheels.

In some embodiments, the vehicle may also be configured to include circuitry. In some embodiments, the circuitry may be configured to engage a K-turn mode when an amount that the front wheels of the vehicle is turned exceeds a turn threshold. In some embodiments, while operating in the K-turn mode, the processing circuitry may control the backward torque to the outer rear wheel of the vehicle using a first rear motor and backward torque to the inner rear wheel using a second rear motor.

In some embodiments, the at least one first motor comprises a first front motor configured to transmit torque to an outer front wheel and a second front motor configured to transmit torque to an inner front wheel. In yet another embodiment, the at least one second motor may comprise a third rear motor configured to transmit torque to an outer rear wheel and a forth rear motor configured to transmit torque to an inner rear wheel.

According to another embodiment, while operating in the K-turn mode, the processing circuitry may be configured to control the at least one first motor to provide forward torque to the front wheels of the vehicle. In some embodiments, the at least one first motor may provide forward torque to an inner front wheel while maintaining slippage of the inner front wheel relative to a ground. In some embodiments, the at least one first motor may provide forward torque to an outer front wheel while maintaining slippage of the outer front wheel relative to the ground.

While operating in the K-turn mode, the processing circuitry may be configured to control the at least one second motor to provide backward torque to the rear wheels of the vehicle. In some embodiments, the at least one second motor may provide backward torque to an inner rear wheel while maintaining the inner rear wheel in static contact with a ground. In some embodiments, the at least one second motor may provide backward torque to an outer rear wheel of the vehicle while maintaining the outer rear wheel in static contact with the ground.

In some embodiments, the vehicles may be configured to include a front differential mechanically coupled to the at least one first motor and the front wheels. In some embodiments, the at least one first motor may provide torque to the front wheels via the front differential. In some embodiments, the vehicles may also be configured to include a rear differential mechanically coupled to the at least one second motor and the rear wheels. In some embodiments, the at least one second motor may provide torque to the rear wheels via the rear differential.

In some embodiments, a non-transitory computer-readable medium having instructions encoded thereon for turning a vehicle in a K-turn mode is provided. In some embodiments, the encoded instructions may be executed by control circuitry of a vehicle having front wheels and rear wheels. In some embodiments, the control circuitry is configured to engage a K-turn mode when an amount that the front wheels of the vehicle is turned exceeds a turn threshold. According to some embodiments, while operating in the K-turn mode, the processing circuitry based on the encoded instructions, may cause forward torque to be applied to the front wheels of the vehicle and cause backward torque to be applied to the rear wheels of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

FIGS. 7A-C depict various examples of illustrative flow diagrams of processes for operating a vehicle in a K-turn mode, in accordance with some embodiments of the disclosure;

DETAILED DESCRIPTION

The present disclosure is directed to operating a vehicle in a K-turn mode. In some embodiments, the front and back drive shafts of the vehicle may be independently controlled. In some embodiments, the vehicle may be configured, when certain conditions are met (e.g., when the speed of the vehicle is low enough and/or when the front wheels are turned far enough), to operate in the K-turn mode. In some embodiments, while operating in the K-turn mode, the vehicle is configured such that forward torque is provided to the front wheels of the vehicle and backward torque is provided to the rear wheels of the vehicle. The K-turn mode allows a vehicle to turn with a significantly reduced turn radius.

As referred to herein, the term "K-turn mode" refers to any kind of a mode or technique for operating a vehicle such that front and rear wheels of the vehicle are provided with torques in opposite directions. For example, the front wheels of the vehicle are operated with forward torque and the rear wheels of the vehicle are operated with backward torque. In another example, the front wheels of the vehicle are operated with backward torque and the rear wheels of the vehicle are operated with forward torque.

As referred to herein, the term "inner wheel" refers to a wheel that is closer to the direction of a turn of the vehicle. For example, during a right turn, the right wheels of the vehicle may be considered "inner wheels," while the left wheels of the vehicle may be considered "outer wheels." In another example, during a left turn, the left wheels of the vehicle may be considered "inner wheels," while the right wheels of the vehicle may be considered "outer wheels."

As referred to herein, the term "front dig mode" refers to any kind of a mode or technique for operating a vehicle such that a resistance is applied to forward rotation of the inner rear wheel of the vehicle.

Figure 1:
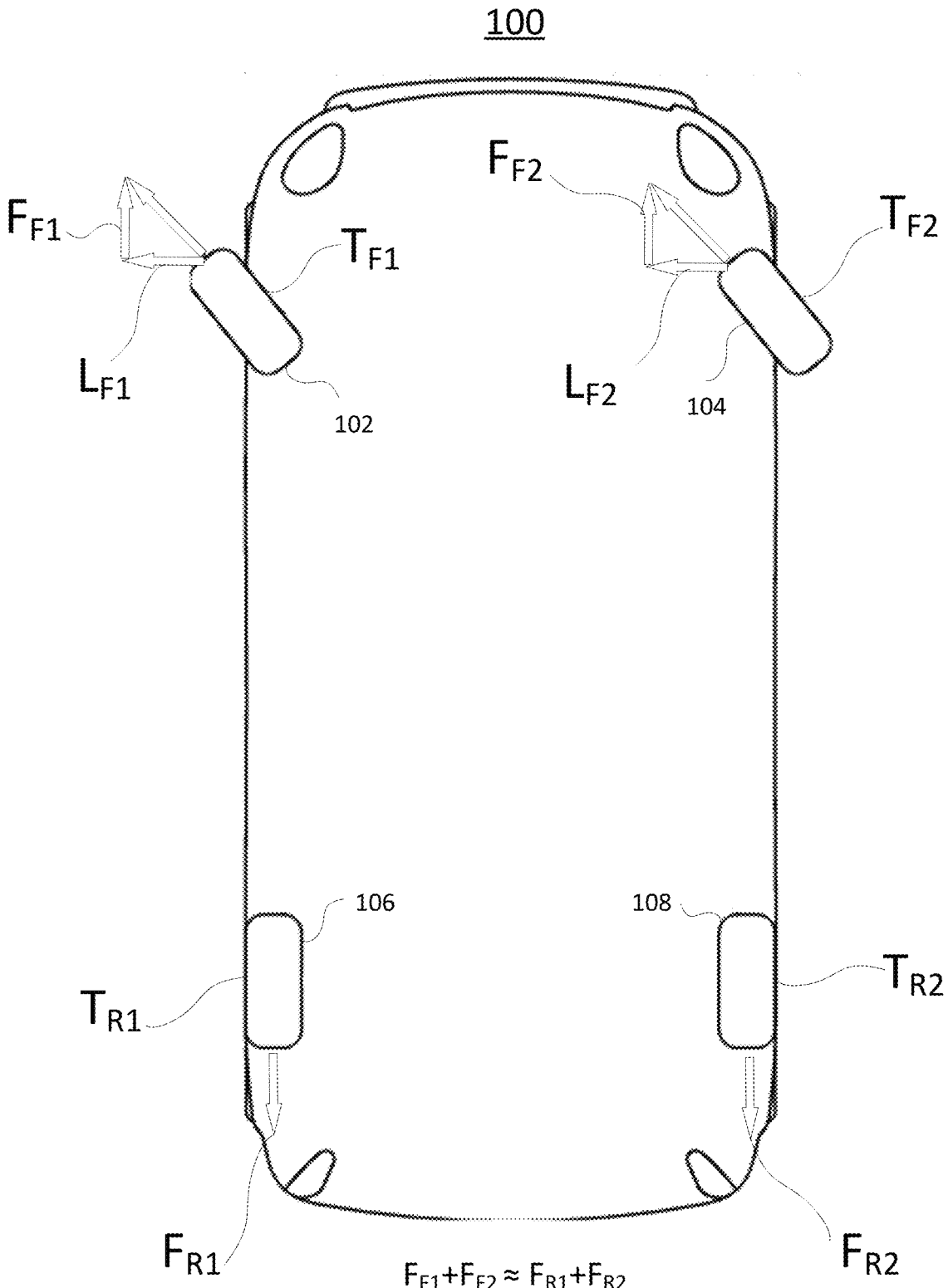
FIG. 1 shows a top view of an illustrative vehicle in accordance with some embodiments of the present disclosure.

FIG. 1 shows a top view of an illustrative vehicle 100 in accordance with some embodiments of the present disclosure. In some embodiments, vehicle 100 may be a coupe, a sedan, a truck, a bus, or any other type of vehicle.

In some embodiments, vehicle 100 may include a front left wheel 102, front right wheel 104, rear left wheel 106, and rear right wheel 108. In some embodiments, front left wheel 102 and front right wheel 104 may be connected via a drive shaft (not shown). In some embodiments, the rear wheels may provide backward torques ($T_{R1}$ and $T_{R2}$) to the vehicle. For example, the rear left wheel 106 may provide backward torque $T_{R1}$ to the vehicle and the rear right wheel 108 may provide backward torque $T_{R2}$ to the vehicle. In some embodiments, the front wheels may provide forward torques ($T_{F1}$ and $T_{F2}$) to the vehicle. For example, the front left wheel 102 may provide forward torque $T_{F1}$ to the vehicle and the front right wheel 104 may provide forward torque $T_{F2}$ to the vehicle.

In some embodiments, the forward torques ($T_{F1}$ and $T_{F2}$) may cause front forces to be exerted on the ground by the front wheels. For example, the front forces may provide forward force components ($F_{F1}$ and $F_{F2}$) and lateral force components ($L_{F1}$ and $L_{F2}$). For some examples, the backward torques ($T_{R1}$ and $T_{R2}$) may cause rearward force components ($F_{R1}$ and $F_{R2}$) that the ground exerted on the rear wheels of the vehicle. According to an embodiment, a sum of the forward force components ($F_{F1}$ and $F_{F2}$) is substantially equal to a sum of the rearward force components ($F_{R1}$ and $F_{R2}$).

As illustrated, while in the K-turn mode, as the torques are provided to the wheels of the vehicle, the front wheels (102 and 104) being turned in excess of the turn threshold, the forward force components ($F_{F1}$ and $F_{F2}$) acting on the front wheels and the rearward force components ($F_{R1}$ and $F_{R2}$) acting on the rear wheels (106 and 108) are substantially equal to each other. Assuming the forward torque to the front wheels and the backward torque to the rear wheels are maintained, an exemplary equation illustrating that the sum of these forces is satisfied as follows:

$$F_{F1} + F_{F2} \approx F_{R1} + F_{R2} \qquad \text{(Eq. 1)}$$

In some embodiments, the backward torque ($T_{R1}$ and $T_{R2}$) may cause the rear wheels (106 and 108) to remain substantially in static contact with a ground. For example, as the backward torque is applied to the rear wheels, the rear wheels remain in contact with the ground and avoid slipping in relation to the ground. In some examples, as the backward torque is applied to the rear wheels, the inner rear wheel may rotate slightly (forward or backward) as the vehicle is rotated and the outer rear wheel may rotate slightly (forward or backward) in the opposite direction of the inner rear wheel. In some embodiments, the forward torque ($T_{F1}$ and $T_{F2}$) may cause the front wheels (102 and 104) to slip relative to the ground. As the front wheels (102 and 104) slip, the lateral force components ($L_{F1}$ and $L_{F2}$) act on the wheels and turn the vehicle. For example, the lateral force components ($L_{F1}$ and $L_{F2}$) may cause the vehicle to pivot around a point under the chassis of the vehicle.

In some embodiments, vehicle 100 may operate in K-turn mode during a turn. A left turn is depicted by FIG. 1, however those skilled in the art will recognize that similar techniques can be used to perform a right turn.

Figure 2:
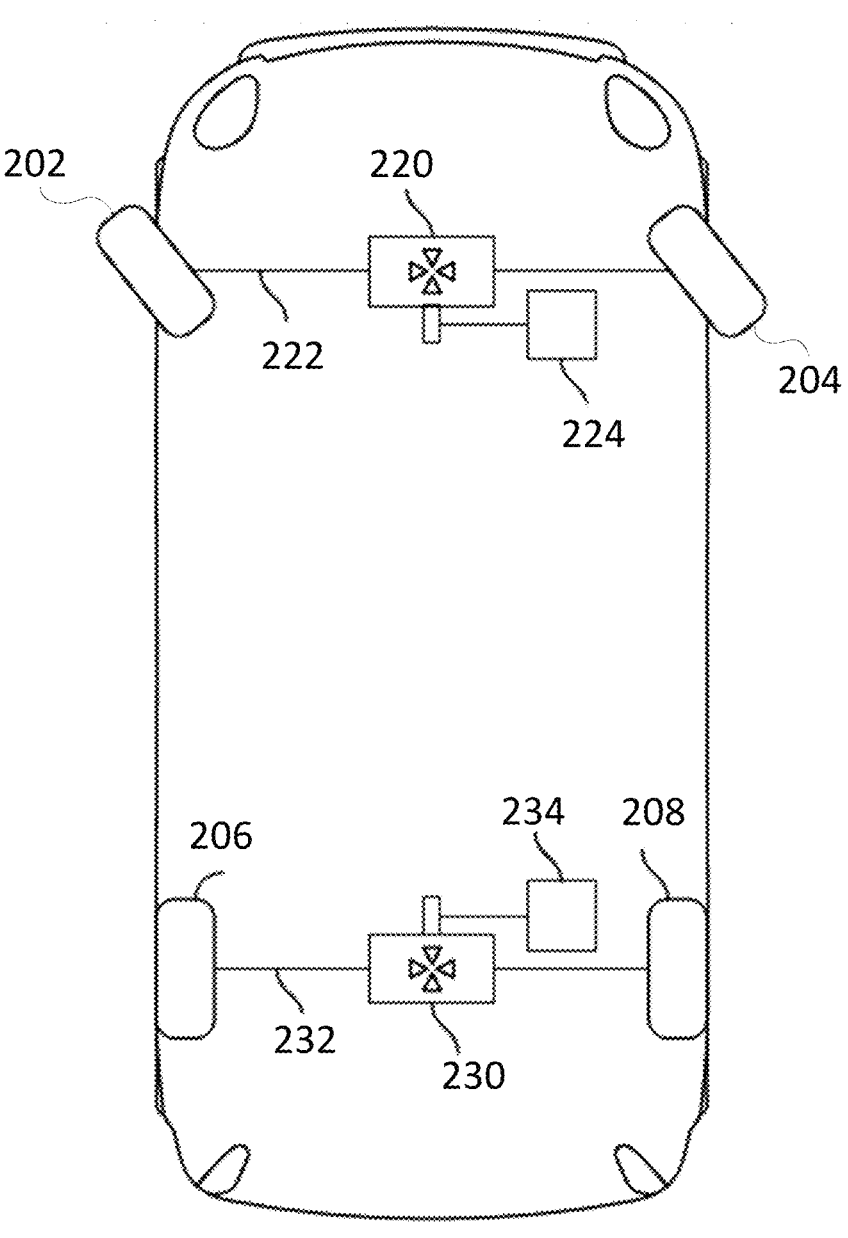
FIG. 2 shows another top view of an illustrative vehicle in accordance with some embodiments of the present disclosure.

FIG. 2 shows a top view of an illustrative vehicle 200 in accordance with some embodiments of the present disclosure. In some embodiments, vehicle 200 may be a coupe, a sedan, a truck, a bus, or any other type of vehicle.

In some embodiments, vehicle 200 may include a front left wheel 202, front right wheel 204, rear left wheel 206, and rear right wheel 208. In some embodiments, vehicle 200 may include a drive shaft 222, which includes a differential 220 (e.g., a locking differential, a limited slip differential, an electronically controlled differential, or any other torque splitting device). In some embodiments, vehicle 200 may include motor 224. Motor 224 may be connected to drive shaft 222 (e.g., via a belt, chains, gears, or any other connection device). In some embodiments, motor 224 may be configured to provide backward and forward torque to drive shaft 222.

In some embodiments, rear left wheel 206 and rear right wheel 208 may be connected via drive shaft 232. In some embodiments, drive shaft 232 may include a differential 230 (e.g., a locking differential, a limited slip differential, an electronically controlled differential, or any other torque splitting device). In some embodiments, vehicle 200 may include a motor 234. Motor 234 may be connected to drive shaft 232 (e.g., via a belt, chains, gears, or any other connection device). In some embodiments, motor 234 may be configured to provide backward and forward torque to drive shaft 232.

In some embodiments, motors 224 and 234 may be any kind of motors capable of generating power (e.g., gas motors, electric motors). In some embodiments, motors 224 and 234 may be devices connected to a primary single motor (not shown) and configured to independently transfer power from a single motor to drive shaft 222 and drive shaft 232, respectively.

In some embodiments, vehicle 200 may comprise processing circuitry. In some embodiments, the processing circuitry may comprise an on-board vehicle computer that is capable of controlling multiple features or capabilities of the vehicle. In some embodiments, processing circuitry may be communicatively connected with user inputs of the vehicle, sensors of the vehicle, and transitory or non-transitory memory (e.g., memory-storing institutions for operating the vehicle).

In some embodiments, vehicle 200 may include a plurality of sensors. For example, some of the plurality of sensors may include sensors for determining the speed of vehicle 200, the degree to which the front wheels 202, 204 of the vehicle are turned, vehicle rotation sensor, wheel rotation sensors and accelerometer sensor.

In some embodiments, the processing circuitry of vehicle 200 may be capable of directly controlling features of vehicle 200 with or without user input. In another example, control circuitry may be able to actuate motor 224 to provide a specified amount of backward or forward torque to front drive shaft 222. In another example, control circuitry may be able to actuate motor 234 to provide a specified amount of backward or forward torque to rear drive shaft 232.

In some embodiments, the processing circuitry of vehicle 200 may engage the K-turn mode when one or more conditions are met. For example, a user may press a button or turn a lever to request the K-turn mode. In some embodiments, instead of, or in addition to the user request, the processing circuitry may determine how far front wheels 202 and 204 are turned. In some embodiments, the K-turn mode is activated when wheels 202 and 204 are turned more than a certain amount (e.g., more than 70% of maximum turn). In some embodiments, the user may explicitly request the K-turn mode (e.g., by pressing a K-turn button), but the K-turn mode will be activated by the processing circuitry only when the aforementioned wheel turn criterion is met.

In some embodiments, while operating in K-turn mode, the processing circuitry of vehicle 200 may provide forward torque to front wheels 202, 204 (e.g., by providing forward torque to drive shaft 222) using motor 224. In some embodiments, the processing circuitry may also provide backward torque to the rear wheels 206, 208 (e.g., by providing backward torque to drive shaft 232) using motor 234.

Figure 3:
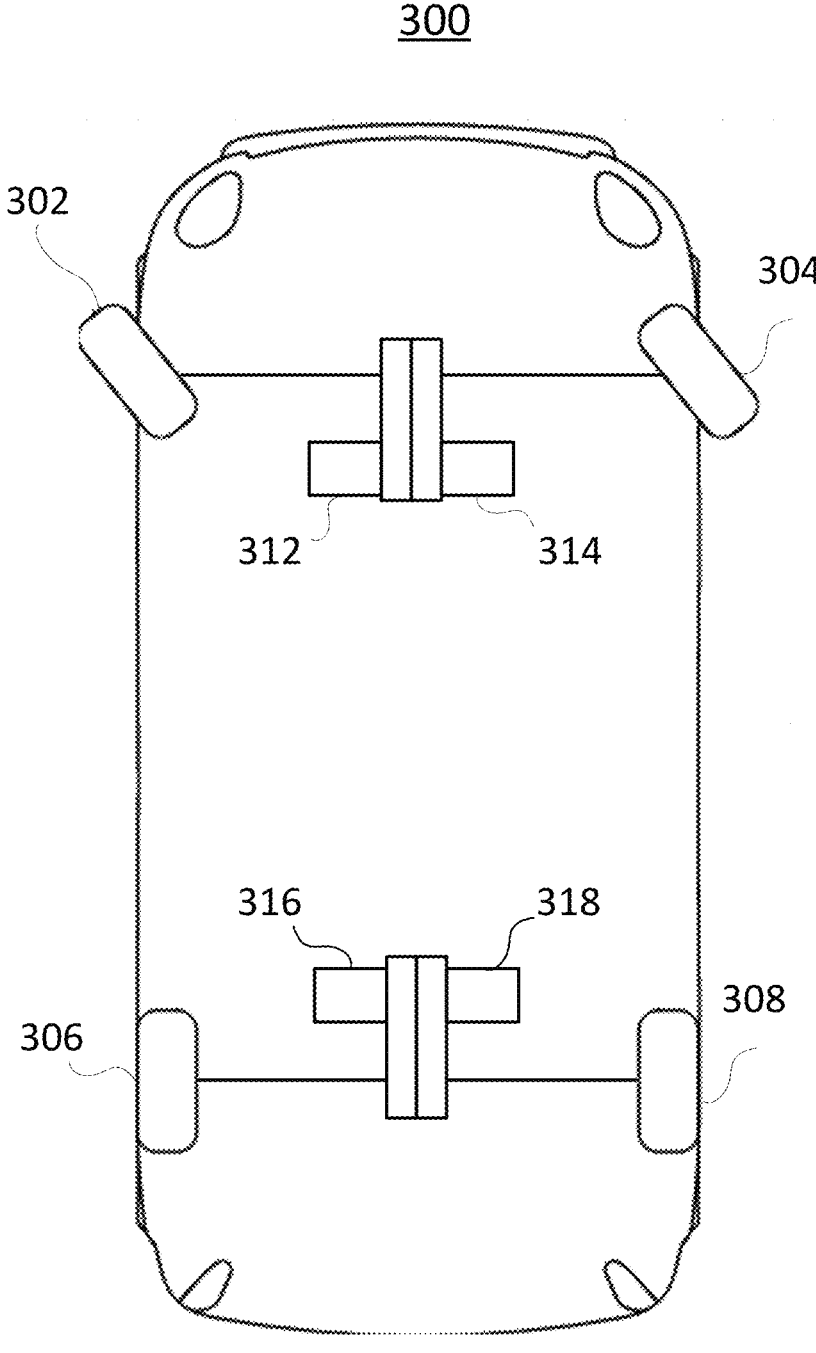
FIG. 3 shows another top view of an illustrative vehicle in accordance with some embodiments of the present disclosure.

FIG. 3 shows a top view of an illustrative vehicle 300 in accordance with some embodiments of the present disclosure. In some embodiments, vehicle 300 may be a coupe, a sedan, a truck, a bus, or any other type of vehicle.

In some embodiments, vehicle 300 may include a front left wheel 302, front right wheel 304, rear left wheel 306, and rear right wheel 308. In some embodiments, vehicle 300 may include a motor 312. Motor 312 may be connected to wheel 302 (e.g., via a belt, chains, gears, or any other connection device). Vehicle 300 may also include motors 314, 316, 318 which are similarly connected to wheels 304, 306, 308, respectively. In some embodiments, motors 312, 314, 316, and 318 may be configured to provide forward or backward torque to their respective wheels 302, 304, 306, and 308.

In some embodiments, motors 312, 314, 316, and 318 may be any kind of motors capable of generating power (e.g., gas motors, electric motors). In some embodiments, motors 312, 314, 316, and 318 may be devices connected to a primary single motor (not shown) and configured to independently transfer power from a single motor to wheels 302, 304, 306, and 308, respectively.

In some embodiments, vehicle 300 may comprise processing circuitry. In some embodiments, the processing circuitry may comprise an on-board vehicle computer that is capable of controlling multiple features or capabilities of the vehicles. In some embodiments, processing circuitry may be communicatively connected with user inputs of the vehicle, sensors of the vehicle, and transitory or non-transitory memory (e.g., memory that stores institutions for operating the vehicle).

In some embodiments, vehicle 300 may include a plurality of sensors. For example, some of the plurality of sensors may include sensors for determining speed of vehicle 300, the degree to which the front wheels 302, 304 of vehicle 300 are turned, vehicle rotation sensor to determine the rotation of the vehicle in the K-turn mode, wheel rotation sensors to determine the slipping of each of the wheels 302, 304, 306, and 308 of vehicle 300 and accelerometer sensor.

In some embodiments, the processing circuitry of vehicle 300 may be capable of directly controlling features of vehicle 300 with or without user input. In another example, control circuitry may be able to actuate motor 312 to provide a specified amount of backward or forward torque to wheel 302. Similar, control circuitry may be able to actuate any of motors 314, 316, 318 to provide a specified amount of backward or forward torque to wheels 304, 306, 308, respectively.

In some embodiments, the processing circuitry of vehicle 300 may engage the front dig mode when one or more conditions are met. For example, a user may press a button or turn a lever to request the front dig mode. In some embodiments, instead, or in addition to the user request, the processing circuitry may determine how far front wheels 302 and 304 are turned. In some embodiments, the K-turn mode is activated when wheels 302 and 304 are turned more than a certain amount (e.g., more than 70% of maximum turn).

In some embodiments, while operating in K-turn mode, the processing circuitry of vehicle 300 may provide forward torque to front wheels 302, 304 (e.g., by using motors 312 and 314). In some embodiments, the processing circuitry may apply backward torque to the rear wheels 306, 308 of vehicle 300, for example by using motors 316 and 318.

In some embodiments, vehicle 300 may operate in a K-turn mode during a turn. A left turn is described herein, however those skilled in the art will recognize that a similar technique may be used to perform a right turn.

The foregoing FIGS. 2 and 3 are merely illustrative of the principles of this disclosure and various modifications may be made by those skilled in the art without departing from the scope of this disclosure. The above described embodiments are presented for purposes of illustration and not of limitation. For example, any combination of motors and drivetrains may be used in a vehicle in accordance with the present disclosure. In some examples, the rear motors of FIG. 3 may be used in combination with the front motor of FIG. 2. According to such a configuration, the vehicle includes three motors (one front motor and two rear motors). In another example, the front motor of FIG. 3 may be used in combination with the rear motors of FIG. 2. According to such a configuration, the vehicle includes three motors (two front motors and one rear motor).

In some embodiments, the K-turn mode may be used on a vehicle with any combination of axles in accordance with the present disclosure. For example, the vehicle may have a steered axle and a non-steered axle. The steered axle may provide one wheel or a plurality of wheels that will steer the vehicle in a direction. In some embodiments, the steered axle may be provided at the rear of the vehicle. For example, as the user provides an input to steer the vehicle, the rear wheels will turn. In some embodiments, the non-steered axle may provide one wheel or a plurality of wheels that will provide torque of the vehicle. In some embodiments, the vehicle may provide two axles (e.g., steered and non-steered axles). For example, the configuration displayed in vehicle 200 (FIG. 2) or vehicle 300 (FIG. 3). In some embodiments, the vehicle may provide three or more axles. For example, the three or more axles may provide at least one steered axle and two or more non-steered axles. According to such a configuration, when the at least one steered axle is turned past a turn threshold, the K-turn mode may be engaged. As the K-turn mode is engaged, the at least one steered axle may provide forward torque to the vehicle and the two or more non-steered axles may provide backward torque to the vehicle in accordance with the present disclosure.

In some embodiments, the K-turn mode can be used in any vehicle capable of distributing torque and/or breaking to the wheels of the vehicle. For example, the vehicle is may provide for independent distributing of torque to the front wheels and the rear wheels. According to another example, the vehicle may provide for independent distribution of torque and breaking to the front wheels and the back wheels.

Figure 4:
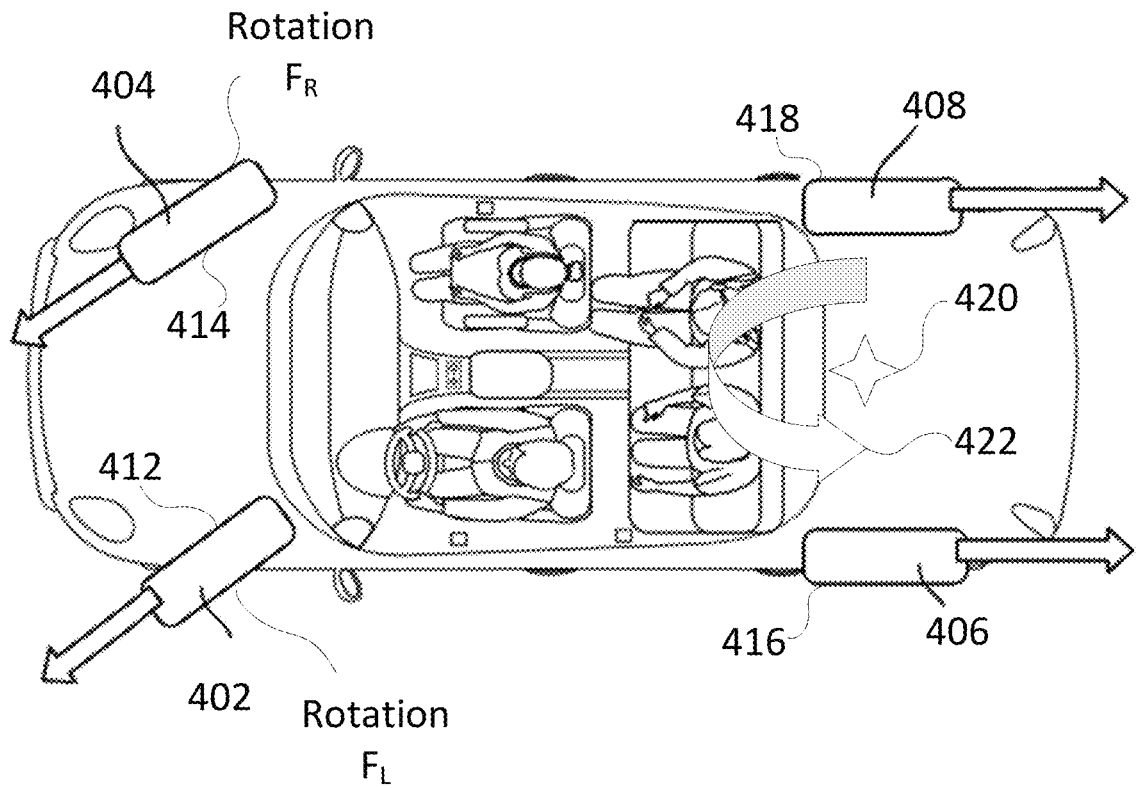
FIG. 4 shows yet another top view of an illustrative vehicle in accordance with some embodiments of the present disclosure.

FIG. 4 shows a top view of an illustrative vehicle 400 in accordance with some embodiments of the present disclosure. In some embodiments, vehicle 400 may be a coupe, a sedan, a truck, a bus, or any other type of vehicle. In some embodiments, vehicle 400 may be any one of vehicles 200 or 300.

In some embodiments, vehicle 400 is operating in a K-turn mode. As shown in FIG. 4, front wheels 402 and 404 are turned in the direction of a turn (e.g., left) and are being provided with forward torques 412, 414. At the same time, rear wheels 406 and 408 are being provided with backward torques 416, 418. In some embodiments the rear wheels of the vehicle are substantially in static contact with a ground while the front wheels of the vehicle are slipping relative to the ground. As the longitudinal forces counter each other, the lateral forces on the front wheels 402, 404 pivot the front of the vehicle about the pivot point 420. As a result of resultant forces indicated by arrows, vehicle 400 turns around point 420 in a direction indicated by arrow 422.

In some embodiments, while operating in the K-turn mode, the rear wheels 206, 208 of the vehicle are substantially in static contact with a ground. For example, the outer rear wheel and the inner rear wheel contact the ground and do not slip relative to the ground. In some embodiments, while operating in the K-turn mode, the front wheels 202, 204 of the vehicle may slip relative to the ground. For example, each of the outer front wheel and the inner front wheel may slip relative to the ground. As a result of resultant forces indicated by arrows and illustrated in FIG. 1, vehicle 400 turns around point 420 with in a direction indicated by arrow 422.

Figure 5:
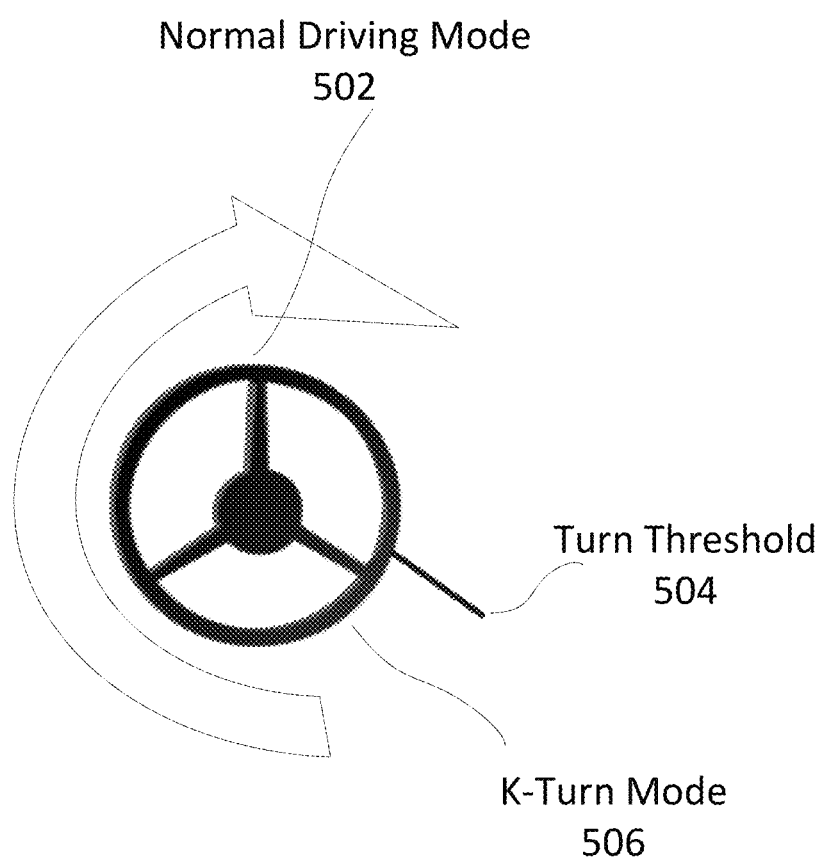
FIG. 5 depicts an illustrative front view of a steering wheel of a vehicle that is configured in accordance with some embodiments of the present disclosure.

FIG. 5 shows a front view of an illustrative steering wheel 500 of a vehicle (e.g., vehicle 200 or 300) in accordance with some embodiments of the present disclosure.

In some embodiments, the rotation of steering wheel 500 can be used by the processing circuitry (e.g., the processing circuitry of vehicle 200 or 300) to engage K-turn mode.

In some embodiments, steering wheel 500 may include turn threshold 504 (e.g., 2.5 full revolutions). If the rotation of steering wheel 500 did not reach the turn threshold 504, the vehicle may operate in a normal driving mode 502.

In some embodiments, turn threshold 504 may have an associated false stop. For example, when the user rotates steering wheel 500 to turn threshold 504, the user may experience resistance (e.g., provided by springs, a detent, or any other type of mechanism). In some embodiments, if the user rotates steering wheel 500 past turn threshold 504 (e.g., by overcoming the false stop resistance), the processing circuitry may begin operating the vehicle in K-turn mode 506. In some embodiments, the K-turn mode may have a phase out range, where the K-turn is phased out. For example, while operating in the K-turn mode, when the user rotates the steering wheel 500 out of the turn threshold, the vehicle may phase out of the K-turn mode until the wheel is out of the turn threshold and the K-turn is disengaged.

The foregoing enables a driver to have accurate control of the center of rotation, and thus turn radius, in the K-turn mode.

Figure 6:
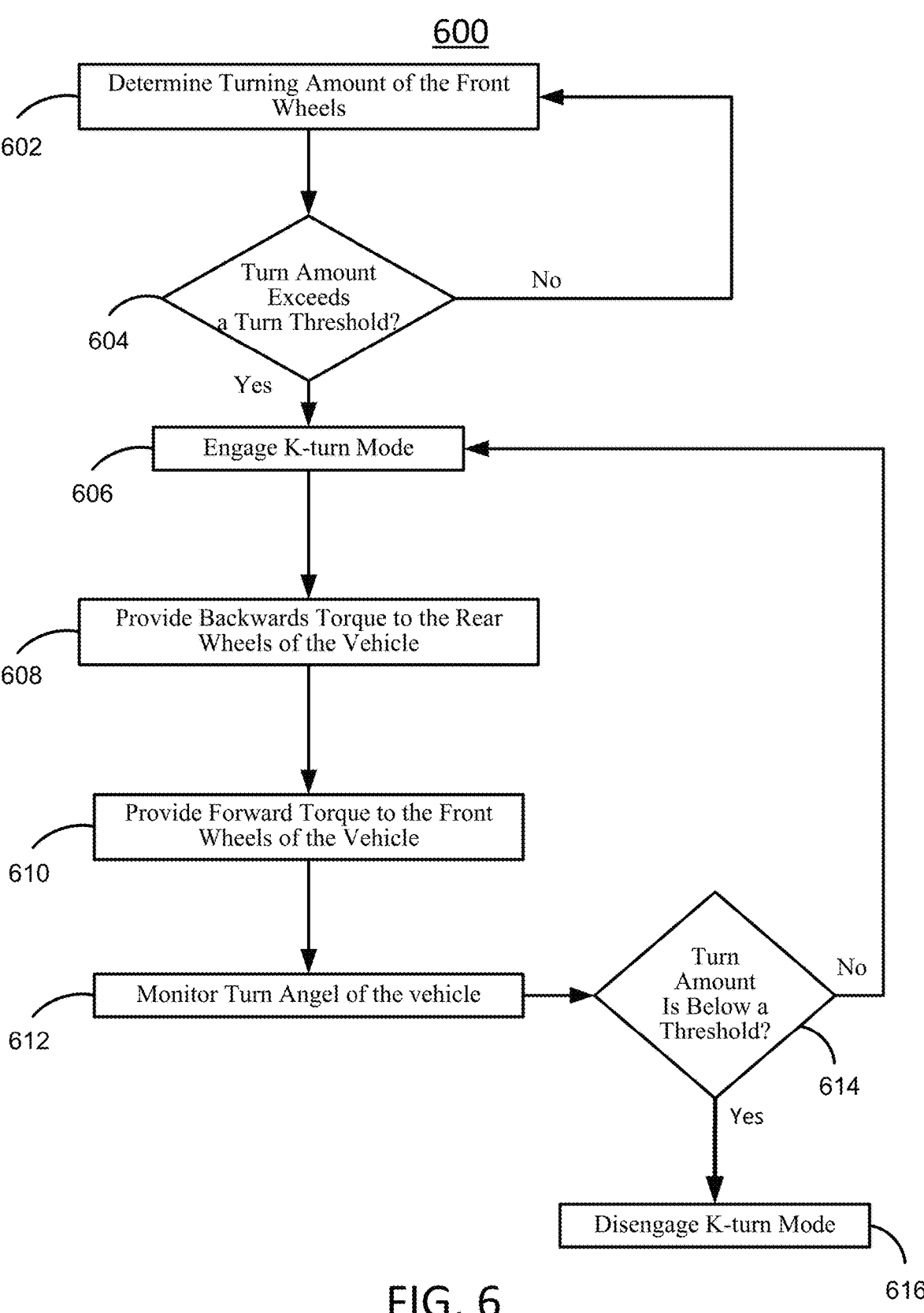
FIG. 6 depicts an illustrative flow diagram of a process for operating a vehicle, in accordance with some embodiments of the present disclosure.

FIG. 6 depicts an illustrative flow diagram of a process 600 for operating a vehicle in several modes in accordance with several embodiments of the disclosure. In some embodiments, process 600 may be executed by processing circuitry of vehicle 200 (FIG. 2) or vehicle 300 (FIG. 3). It should be noted that process 600 or any step thereof could be performed on, or provided by, the system of FIG. 12. In addition, one or more steps of process 600 may be incorporated into or combined with one or more other steps described herein.

Process 600 begins at 602, where the processing circuitry may determine a turn amount of the front wheels of the vehicle (e.g., the turn angle of wheels 202 and 204 or wheels 302 and 304). For example, the processing circuitry may use a gauge connected to each of the front wheels and configured to provide a turn angle of each wheel. In some embodiments, the processing circuitry may determine the turn angle of the wheels based on how far the steering wheel of the vehicle is turned.

Process 600 continues at 604 where the processing circuitry may proceed depending on the outcome of step 602. For example, if the turn angle of at least one front wheel is above a turn threshold (e.g., 70%), the processing circuitry may proceed to step 606. Otherwise, process 600 may return to step 602 and continue monitoring the turn angles of the wheels of the vehicle.

At 606, the processing circuitry may engage the K-turn mode. As part of the K-turn mode, the processing circuitry may perform steps 608-612. Steps 608-612 may be performed in any order, or simultaneously.

At 608, the processing circuitry may provide backward torque to the rear wheels of the vehicle. For example, the processing circuitry may use motor 234 to provide backward torque to drive shaft 232. In some embodiments, the processing circuitry may actuate motors 316 and 318 to provide backward torque to wheels 306 and 308.

At 610, the processing circuitry may provide forward torque to the front wheels of the vehicle. For example, the processing circuitry may actuate motor 224 to provide forward torque to drive shaft 222. In some embodiments, the processing circuitry may actuate motors 312 and 314 to provide forward torque to wheels 302 and 304. In some embodiments, the amount of forward torque provided to the front wheels is based on the amount the accelerator pedal is pressed. For example, the amount of torque may be proportional to the amount the accelerator pedal is pressed or may be determined using a look-up table. In some embodiments, the forward torque to wheels 302 and 304 is higher than the backward torque to wheels 306 and 308.

In some embodiments, steps 608-612 may be adjusted based on user input. For example, the amount of torque provided to the front wheels of the vehicle and to the rear wheels of the vehicle may be proportional to how far the user presses the accelerator pedal or may be determined based on a look-up table. In some embodiments, the amount of forward torque provided to the front wheels is greater than the amount of backward torque provided to the rear wheels. In some embodiments, if the user stops pressing the accelerator pedal, the processing circuitry may stop providing torque to any of the wheels of the vehicle. In some embodiments, as the accelerator pedal is pressed, the rotation of the vehicle (i.e. yaw rate) about a pivot point is performed. For example, as the user presses the accelerator pedal, the vehicle will begin to rotate about the pivot point, and as the user increases the throttle by pressing the accelerator pedal further, the rotation of the vehicle increases. According to another example, as the user releases the accelerator pedal, the amount of forward torque provided to the front wheels is reduced and the vehicle stops rotating.

In some embodiments, the K-turn mode may be performed on uneven surfaces (e.g., incline/decline surface, banking surface, etc.). An incline surface can be identified by sensors monitoring the orientation of the vehicle. For example, the processing circuitry may determine that the vehicle is on an incline surface with the front wheels being disposed higher than the rear wheels. Based on the determination of the surface being inclined, the processing circuitry may adjust the torques applied to the front and rear wheels to achieve a vehicle rotation rate. For example, the processing circuitry may provide reduced torque to the rear wheels as compared to the front wheels (or additional torque to the front wheels as compared to the rear wheels) because gravity is providing a backward force on the vehicle. According to another example, the processing circuitry may determine that the vehicle is on a banking surface with the inside wheels (i.e., front inside wheel and rear inside wheel) being disposed higher than the outside wheels (i.e., front outside wheel and rear outside wheel). Based on the determination of the surface being banked towards one direction, the processing circuitry may adjust the torques applied to each of the wheels to achieve a vehicle rotation rate in accordance with the present disclosure. For example, the processing circuitry may provide reduced torque to the wheels on the higher side of the vehicle as compared to the wheels on the lower side of the vehicle because the bank causes the higher wheels to carry less of the vehicle weight than the lower wheels, which makes the higher wheels susceptible to slipping under less torque than the lower wheels.

At 614 the processing circuitry may determine that the wheels are no longer turned to a point above the turn threshold. In this case, the processing circuitry may proceed to step 616. Otherwise, the processing circuitry may maintain the K-turn mode at 606. In some embodiments, additional or alternative checks can be performed to determine when to disengage K-turn mode. For example, when the vehicle is on a relatively high friction surface, the K-turn mode can be disengaged. A high friction surface can be identifying by monitoring wheel rotation and the amount of torque applied to the wheels. If a relatively high amount of torque is applied to the wheels and the wheels are not rotating, this may indicate a relatively high friction surface. In such a situation, the K-turn mode can be disengaged to prevent tire and drivetrain wear. In some embodiments, the K-turn mode can be performed on any surfaces (e.g., low friction surfaces, high friction surfaces).

At 616, the processing circuitry may disengage the K-turn mode. For example, the processing circuitry may allow the user to drive the vehicle normally.

FIGS. 7A-C depict various examples of illustrative flow diagrams of processes for operating a vehicle in a K-turn mode, in accordance with some embodiments of the disclosure. As shown in FIG. 7A, according to some embodiments, a process 700A may be executed by processing circuitry of vehicle 200 (FIG. 2) or vehicle 300 (FIG. 3). It should be noted that processes 700A-700C or any step thereof could be performed on, or provided by, the system of FIG. 12. In addition, one or more of processes 700A-700C may be incorporated into or combined with one or more other steps described herein (e.g., incorporated into steps of processes 600 and 1100).

Process 700A begins at 702A, where the processing circuitry may monitor rotation rear wheels (e.g., rear wheels 206, 208). For example, the processing circuitry may monitor for rear wheel slip in at least one of the rear wheels of the vehicle. Process 700A continues at 704A, where the processing circuitry may proceed depending on the outcome of step 704A. For example, if the rotation of at least one of the wheels is greater than a rear wheel spin threshold, the processing circuitry may proceed to step 706A. Otherwise, process 700A may return to step 702A and continue monitoring the rear wheels rotation of the vehicle.

At 706A, the processing circuitry in response to determination that at least one of the wheels is spinning greater than the rear wheel spin threshold, may take corrective action to address the rotation of the rear wheels. The corrective action may apply a brake to the rear wheels or may reduce backward torque to the rear wheels. For example, the processing circuitry, in response to determining that at least one of the rear wheels is slipping, may apply a brake to the rear wheel to stop the rear wheel from slipping or may reduce the backward torque to the rear wheel slipping.

As shown in FIG. 7B, according to some embodiments, a process 700B may be executed by processing circuitry of vehicle 200 (FIG. 2) or vehicle 300 (FIG. 3).

Process 700B begins at 702B, where the processing circuitry may monitor rotation of each of the front wheels 202, 204. For example, the processing circuitry may monitor for front wheel slippage of the front wheels of the vehicle. Process 700B continues at 704B, where the processing circuitry may proceed depending on the outcomes of step 704B. At 704B, the processing circuitry may compare the rotation of the inner front wheel 202 and the rotation of the outer front wheel 204 and compare the difference of the rotation to a target spin rate for the front wheels. For example, it is the intent of the front wheels to spin, however the spinning of the inner and outer front wheels should be relatively similar as compared to a target spin rate. For example, if the delta between the rotation of the front wheels is greater than a front wheel spin threshold, the processing circuitry may proceed to step 706B. Otherwise, process 700B may return to step 702B and continue monitoring the front wheels rotation.

At 706B, the processing circuitry in response to determination that the delta between the rotation of the front wheels is greater than a front wheel spin threshold, may take corrective actions to address the delta rotation of the front wheels. The corrective actions may apply a brake to the front wheels or may reduce forward torque to the front wheels. For example, the processing circuitry, in response to determining that the delta rotation of the front wheels is greater than a target rate, may apply a brake to the faster spinning front wheel or may reduce the forward torque to the faster spinning front wheel.

As shown in FIG. 7C, according to some embodiments, a process 700C may be executed by processing circuitry of vehicle 200 (FIG. 2) or vehicle 300 (FIG. 3).

Process 700C begins at 702C, where the processing circuitry may monitor a throttle input (e.g., in response to the user pressing an accelerator pedal). Process 700C continues at 704C, where the processing circuitry may monitor rotation information of the vehicle from at least one sensor. These steps may be performed in any order or simultaneously. At 706B, the processing circuitry in response to determination of the throttle input and the rotational information of the vehicle, may control the forward torque to the front wheels of the vehicle and the backward torque to the rear wheels of the vehicle. For example, the processing circuitry may receive rotation information of the vehicle indicating that the vehicle is turning. In some examples, the processing circuitry may also receive throttle input and based on receiving this information, the processing circuitry may control the forward torque to the front wheels of the vehicle and the backward torque to the rear wheels of the vehicle based on the rotational information. For example, if the vehicle is rotating faster than expected based on the throttle input, the processing circuitry may decrease the torques applied to the front and rear wheels to reduce the amount of lateral force applied to the vehicle. As another example, if the vehicle is rotating slower than expected based on the throttle input, the processing circuitry may increase the torques applied to the front and rear wheels to increase the amount of lateral force applied to the vehicle. In some embodiments, a target vehicle rotation rate may be determined based on the throttle input (e.g., using a look-up table) and the processing circuitry may adjust the torques applied to the front and rear wheels to achieve the target vehicle rotation rate.

Figure 8:
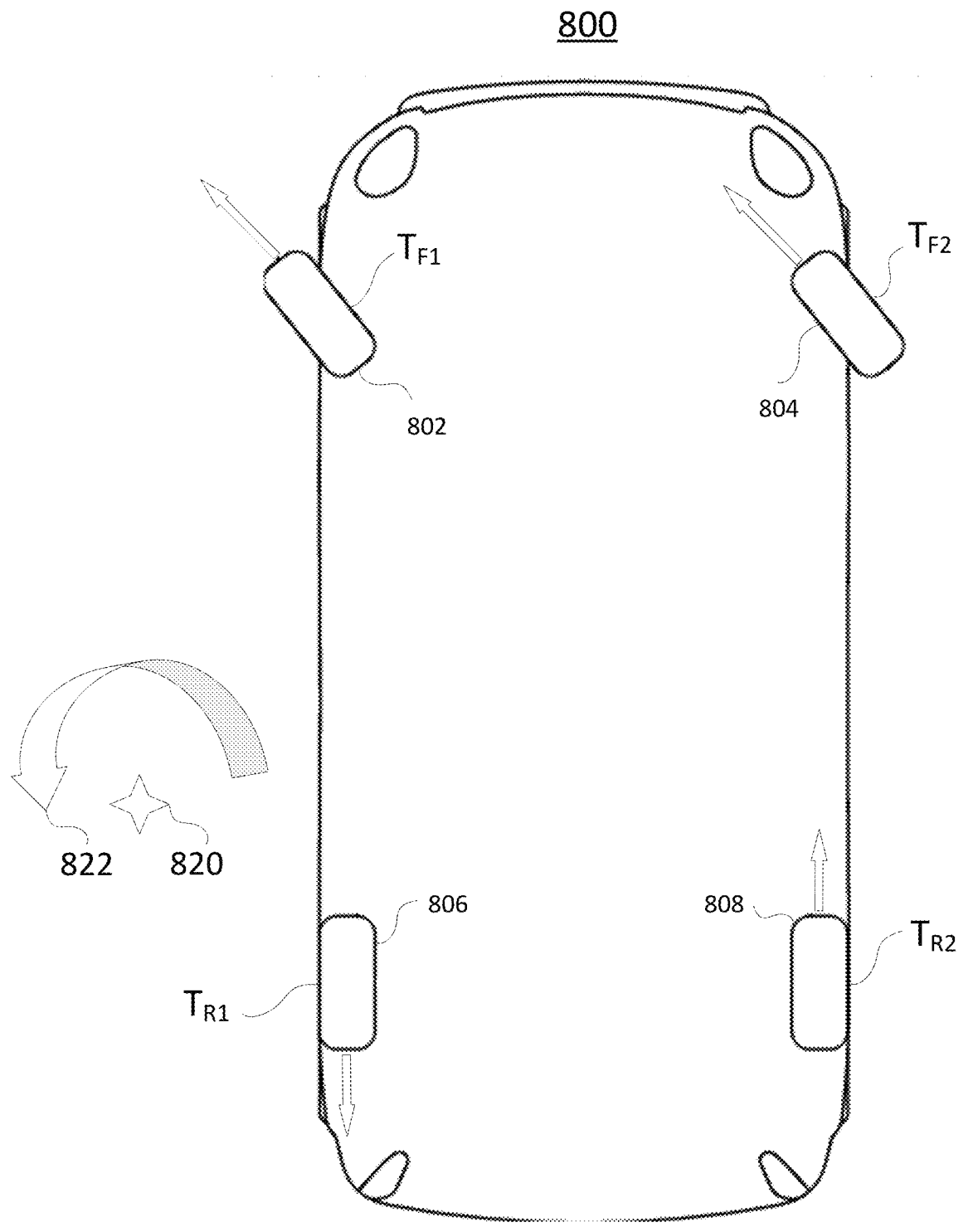
FIG. 8 shows another top view of an illustrative vehicle in accordance with some embodiments of the present disclosure.

FIG. 8 shows a top view of an illustrative vehicle 800 in accordance with some embodiments of the present disclosure. In some embodiments, vehicle 800 may be a coupe, a sedan, a truck, a bus, or any other type of vehicle. In some embodiments, vehicle 800 may be any one of vehicles 200 or 300.

In some embodiments, vehicle 800 is operating in a front dig mode and illustrates the resulting forces of the front dig mode. As shown, front wheels 802 and 804 are provided with forward torques $T_{F1}$, $T_{F2}$ turned in the direction of a turn (e.g., left). The front wheels exhibit minimal slippage and simply rotate in the direction of the front wheels. Outer rear wheel 808 is also being provided with forward torque $T_{R2}$. At the same time, resistance/backward torque $T_{R1}$ is provided to the inner rear wheel 806. For example, a brake is applied to wheel 806. In some embodiments, the inner rear wheel exhibits being dragged while the remaining wheels rotate forward. Such a configuration allows for a reduced turn radius. In some embodiments, wheel 806 is provided with backward torque. As a result of resultant forces indicated by arrows, vehicle 800 turns around point 820 with a direction indicated by arrow 822.

Figure 9:
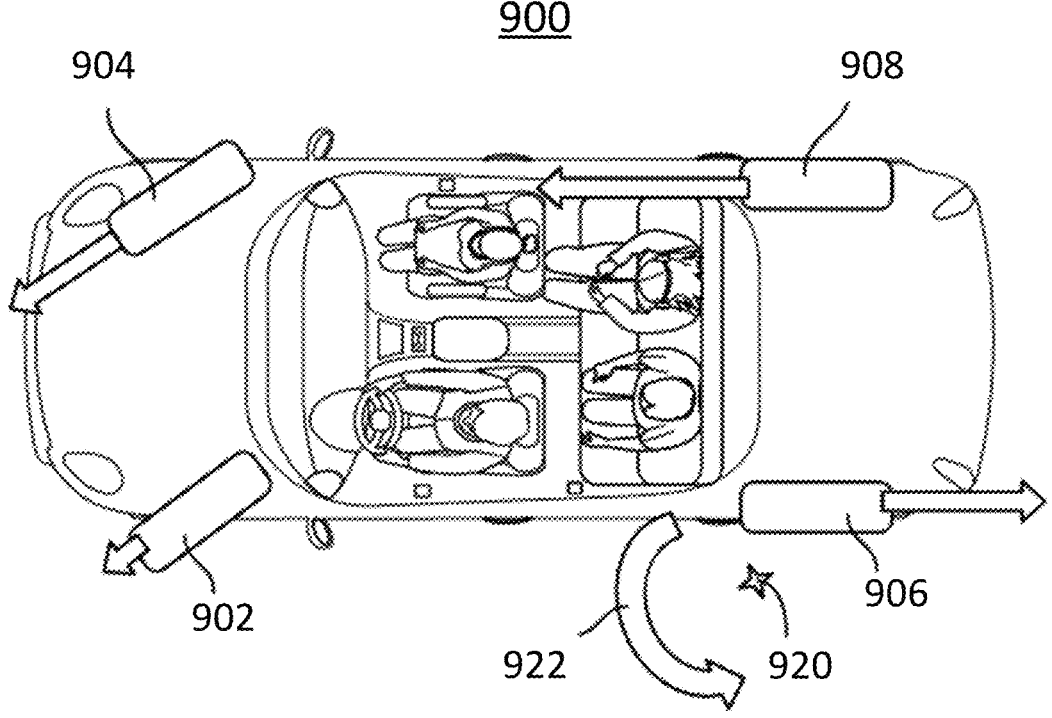
FIG. 9 shows another top view of an illustrative vehicle in accordance with some embodiments of the present disclosure.

FIG. 9 shows a top view of an illustrative vehicle 900 in accordance with some embodiments of the present disclosure. In some embodiments, vehicle 900 may be a coupe, a sedan, a truck, a bus, or any other type of vehicle. In some embodiments, vehicle 900 may be any one of vehicles 200 or 300.

In some embodiments, the processing circuitry of vehicle 900 may engage the front dig mode when one or more conditions are met. For example, a user may press a button or turn a lever to request the front dig mode. In some embodiments, instead of, or in addition to the user request, the processing circuitry may determine how far front wheels 202 and 204 are turned. In some embodiments, the front dig mode is activated when wheels 202 and 204 are turned more than a certain amount (e.g., more than 40% of maximum turn). In some embodiments, the user may explicitly request the front turn mode (e.g., by pressing a front dig mode button), but the front dig mode will be activated by the processing circuitry only when the aforementioned wheel turn criterion is met.

In some embodiments, vehicle 900 is operating in a front dig mode. As shown, front wheels 902 and 904 are turned in the direction of a turn (e.g., left) and are being provided with forward torques. Outer rear wheel 908 is also being provided with a forward torque. At the same time, resistance is provided to the inner rear wheel 906. For example, a brake is applied to wheel 906. In some embodiments, wheel 906 is being provided with backward torque. As illustrated, the forward torques are each different. By providing a different amount of torque to each of the wheels, the location of the turning point of the vehicle can be moved. As a result of resultant forces indicated by the arrows, vehicle 900 turns around point 920 with a direction indicated by arrow 922. The location of point 920 is further back and closer to the vehicle than the location of point 820 in FIG. 8. This is achieved by increasing the forward torque to the outer rear wheel and decreasing the forward torque of the inner front wheel. The torques and thus the location of the turning point of the vehicle in front dig mode can be changed as a function of the position of the steering wheel while in front dig mode.

Figure 10:
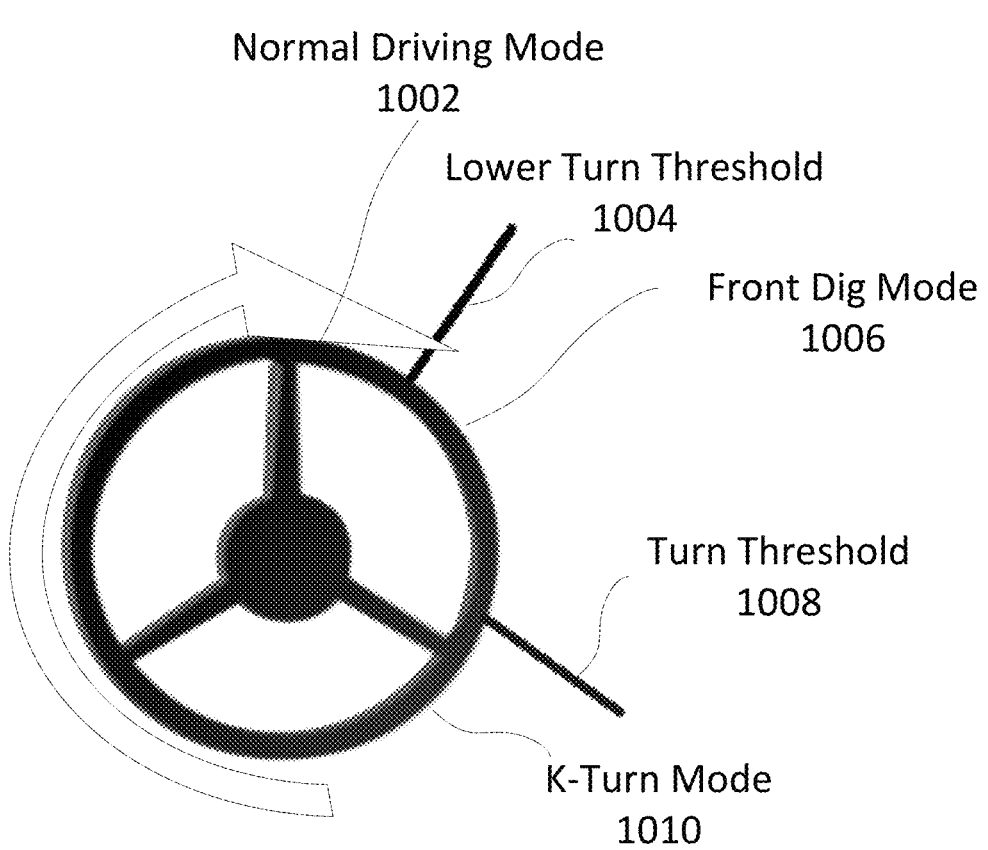
FIG. 10 depicts an illustrative front view of a steering wheel of a vehicle that is configured in accordance with some embodiments of the present disclosure.

FIG. 10 shows a front view of an illustrative steering wheel 1000 of a vehicle (e.g., vehicle 200, 300, 800, or 900) in accordance with some embodiments of the present disclosure.

In some embodiments, the rotation of steering wheel 1000 can be used by the processing circuitry (e.g., the processing circuitry of vehicle 200, 300, 800, or 900) to enter K-turn mode.

In some embodiments, steering wheel 1000 may include turn threshold 1008 (e.g., 2.5 full revolutions). In some embodiments, the steering wheel 1000 may include lower turn threshold 1004 (e.g., 1.5 revolutions). In some embodiments, the lower turn threshold 1004 is optional, and the front dig mode may be activated using other techniques (e.g., as described in relation to FIG. 9).

In embodiments where lower turn threshold 1004 is present, if the rotation of steering wheel 1000 is greater than lower turn threshold 1004, but less than turn threshold 1008, the vehicle may operate in front dig mode 1006. If the rotation of steering wheel 1000 reaches the turn threshold 1008, the vehicle may operate in K-turn mode 1010. In some embodiments, lower turn threshold 1004 may also have an associated false stop. For example, when the user rotates steering wheel 1000 to lower turn threshold 1004, the user may experience resistance (e.g., provided by springs, a detent, or any other type of mechanism). In some embodiments, if the user rotates steering wheel 1000 past turn threshold 1008 (e.g., by overcoming the false stop resistance), the processing circuitry may begin operating the vehicle in K-turn mode 1010.

The foregoing enables a driver to have accurate control of the center of rotation, and thus turn radius, in both the K-turn mode and front dig mode.

Figure 11:
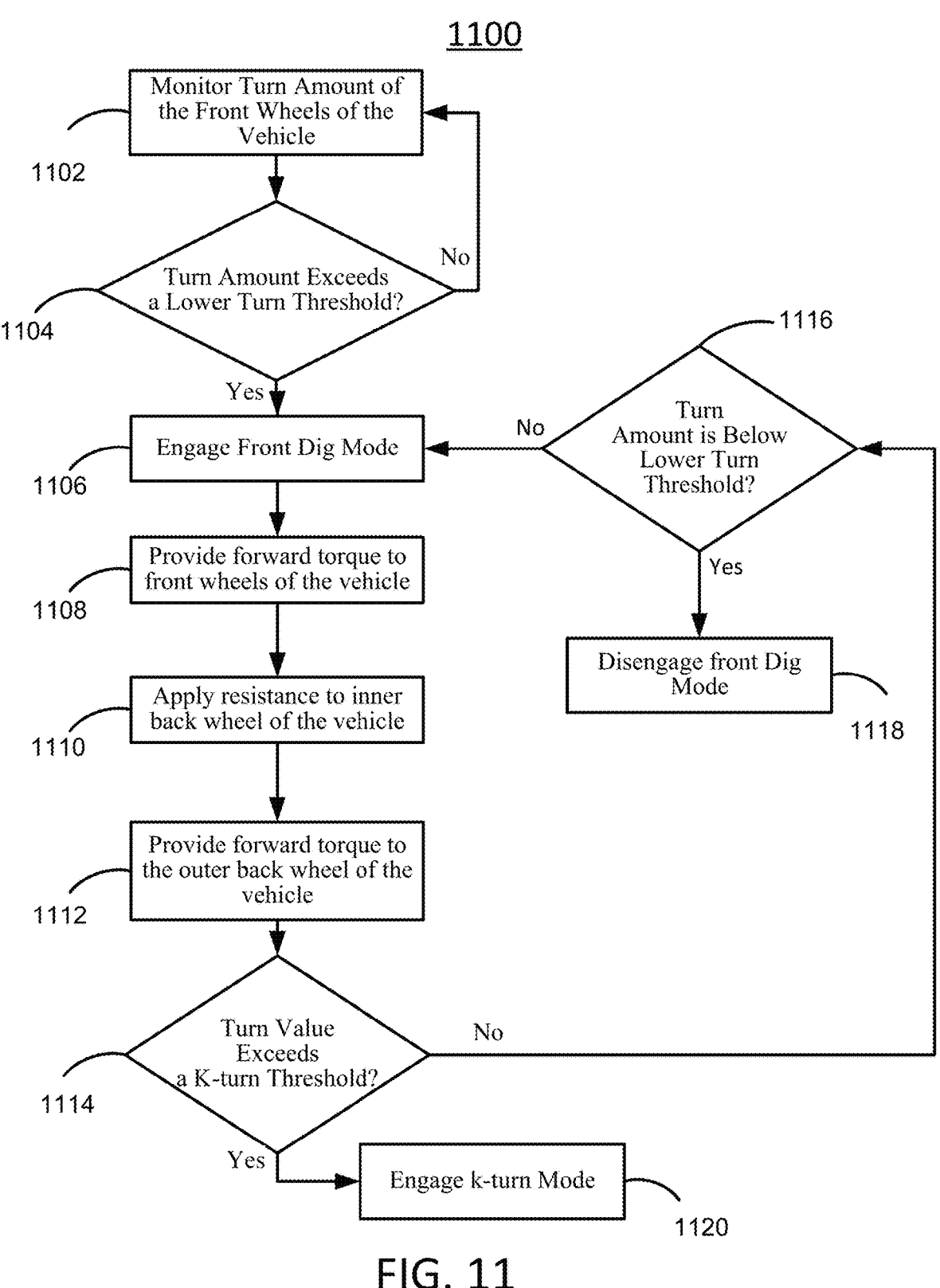
FIG. 11 depicts an illustrative flow diagram of another process for operating a vehicle, in accordance with some embodiments of the present disclosure.

FIG. 11 depicts an illustrative flow diagram of a process 1100 for operating a vehicle in several modes in accordance with several embodiments of the disclosure. In some embodiments, process 1100 may be executed by processing circuitry of vehicle 200 (FIG. 2) or vehicle 300 (FIG. 3). It should be noted that process 1100 or any step thereof could be performed on, or provided by, the system of FIG. 12. In addition, one or more steps of process 1100 may be incorporated into or combined with one or more other steps described herein.

Process 1100 begins at 1102, where the processing circuitry may monitor the turn amount of the front wheels of the vehicle (e.g., steering wheel 1000). For example, the processing circuitry may determine how many steering wheel revolutions were performed by the user and in what direction or the turn amount of the front wheels (e.g., 70% turn of the wheels).

Process 1100 continues at 1104, where the processing circuitry may determine whether the steering wheel is turned past a lower turn threshold (e.g., more than 1.5 revolutions). In some embodiments, the lower turn threshold may be threshold 1004 of FIG. 10. In some embodiments, the processing circuitry may proceed to 1106 if the steering wheel is turned past a lower turn threshold. In some embodiments, the processing circuitry may proceed back to 1102, when the steering wheel is not turned past lower turn threshold.

At 1106, the processing circuitry may engage the front dig mode. As part of the front dig mode, the processing circuitry may perform steps 1108-1112. Steps 1108-1112 may be performed in any order, or simultaneously. In some embodiments, the processing circuitry may disengage from the front dig mode when the steering wheel is turned to be below the lower turn threshold. In some embodiments, the car may then be operated in a normal driving mode.

At 1108, the processing circuitry may provide forward torque to the front wheels of the vehicle. For example, the processing circuitry may actuate motor 224 to provide forward torque to drive shaft 222. In some embodiments, the processing circuitry may actuate motors 312 and 314 to provide forward torque to wheels 302 and 304.

At 1110, the processing circuitry may apply resistance to the inner rear wheel of the vehicle. For example, the processing circuitry may apply a brake to wheel 206 or to wheel 306. In some embodiments, the processing circuitry, may provide backward torque to wheel 306 using motor 316. In some embodiments, the amount of backward torque may be proportional to how far the steering wheel of the vehicle is turned. For example, the further the steering wheel is turned, the more backward torque may be applied, which may further decrease the turn radius.

At 1112, the processing circuitry may provide forward torque to the outer rear wheel of the vehicle. For example, the processing circuitry may use motor 234 to provide forward torque to drive shaft 232. In some embodiments, the processing circuitry may use motor 318 to provide forward torque to wheel 308. In some embodiments, the processing circuitry may provide forward torque to the outer rear wheel of the vehicle a predetermined amount of time after providing forward torque to the front wheels of the vehicle.

In some embodiments, steps 1108-1112 may be adjusted based on user input. For example, the amount of torque provided to the front wheels of the vehicle and to the outer rear wheel of the vehicle may be proportional to how far the user presses the accelerator pedal. In some embodiments, if the user stops pressing the accelerator pedal, the processing circuitry may stop providing torque to any of the wheels of the vehicle. As another example, the amount of resistance provided to the inner rear wheel may vary based on how far the steering wheel is turned past a threshold.

At 1116 the processing circuitry may determine that the wheels are no longer turned to a point above the lower turn threshold. In these cases, the processing circuitry may proceed to step 1118. Otherwise, the processing circuitry may maintain the front dig mode at 1106. In some embodiments, additional or alternative checks can be performed to determine when to disengage front dig mode. For example, when the vehicle is on a relatively high friction surface, the front dig mode can be disengaged. A high friction surface can be identifying by monitoring wheel rotation and the amount of torque applied to the wheels. If a relatively high amount of torque is applied to the wheels and the wheels are not rotating, this may indicate a relatively high friction surface. In such a situation, the front dig mode can be disengaged to prevent tire and drivetrain wear.

At 1118, the processing circuitry may disengage the front dig mode. For example, the processing circuitry may allow the user to drive the vehicle normally.

At 1114, while operating in the front dig mode the processing circuitry may determine whether the steering wheel is turned past a K-turn threshold (e.g., more than 2.5 revolutions). In some embodiments, the lower turn threshold may be threshold 1004 of FIG. 10 and the K-turn threshold may be threshold 1008 of FIG. 10. If so, the processing circuitry may proceed to step 1120. Otherwise, the processing circuitry may proceed back to 1116 and determine whether the steering wheel is turned past a lower turn threshold and continue operating in front dig mode at 1106.

At 1120, the processing circuitry may operate the vehicle in K-turn mode. For example, the processing circuitry may perform steps 606-612 of FIG. 6. These steps may be performed in any order or simultaneously.

Figure 12:
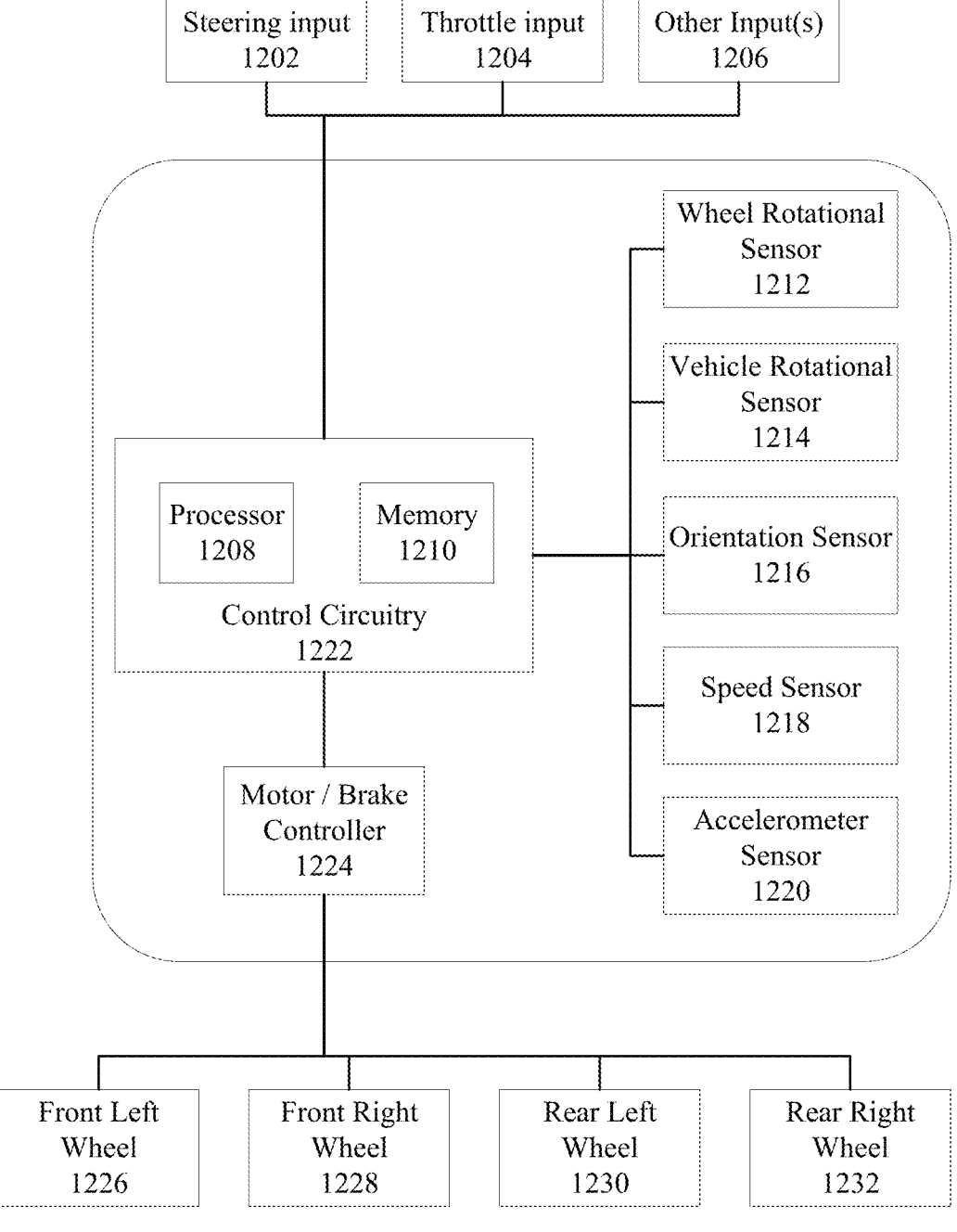
FIG. 12 depicts a system diagram of an illustrative system including control circuitry, inputs variables, sensors and output variables, in accordance with some embodiments of the present disclosure.

FIG. 12 depicts a system diagram of an illustrative system 1200 including control circuitry 1222, inputs variables 1202, 1204, 1206, sensors 1212-1220, motor brake controller 1224 and output variables 1226-1232, in accordance with several embodiments of the disclosure. Illustrative control circuitry 1222 includes processor 1208, and memory 1210.

Control circuitry 1222 may include hardware, software, or both, implemented on one or more modules configured to provide control of front wheels and rear wheels of a vehicle. In some embodiments, processor 1208 includes one or more microprocessors, microcontrollers, digital signal processors, programmable logic devices, field-programmable gate arrays (FPGAs), application-specific integrated circuits (ASICs), or any suitable combination thereof. In some embodiments, processor 1208 is distributed across more than one processor or processing units. In some embodiments, control circuitry 1222 executes instructions stored in memory for managing a dual motor vehicle 200, quad motor vehicle 300, or a triple motor vehicle. In some embodiments, memory 1210 is an electronic storage device that is part of control circuitry 1222. For example, memory may be configured to store electronic data, computer instructions, applications, firmware, or any other suitable information. In some embodiments, memory 1210 includes random-access memory, read-only memory, hard drives, optical drives, solid state devices, or any other suitable memory storage devices, or any combination thereof. For example, memory may be used to launch a start-up routine.

In some embodiments, the system may include wheel rotation sensors 1212, vehicle rotation sensors 1214, orientation sensor 1216, speed sensor 1218, accelerometer sensor 1220. In some embodiments, the control circuitry may be communicatively connected to one or more wheel rotation sensors 1212 that provide data indicative of the wheel rotation of each of wheels of the vehicle 202, 204, 206, 208. In some embodiments, based on the date provided by the wheel rotation sensor, the control circuitry may determine if a wheel is slipping and may apply corrective actions if necessary. In some embodiments, the control circuitry may be communicatively connected to one or more vehicle rotation sensors 1214 that provide data indicative of the rotation of the vehicle. In some embodiments, the control circuitry may be communicatively connected to one or more orientation sensors 1216 that provide data indicative of the orientation of vehicle 100 in 3D space. For example, orientation sensors 1216 may provide data indicative of a pitch angle of vehicle 104, yaw angle of vehicle 104, and roll angle of vehicle 104. In some embodiments, the control circuitry may be communicatively connected to a speed sensor 1218 that provides the current speed of vehicle 100. In some embodiments, the control circuitry may be communicatively connected to an accelerometer sensor 1220 that provides the current acceleration of vehicle 100.

Illustrative system 1200 of FIG. 12 may be used to perform any or all of the illustrative steps of processes 600, 700A-C, and 1100 of FIGS. 6, 7A-C, and 11. Illustrative system 1200 of FIG. 12 may be used to control any of the wheel/motor configurations shown in FIGS. 1-5, in accordance with the present disclosure. In some embodiments, not all components shown in FIG. 12 need be included in system 1200.

It is contemplated that the steps or descriptions of each of FIGS. 1-11 may be used with any other embodiment of this disclosure. It is contemplated that some steps or descriptions of each of FIGS. 1-11 may be optional and may be omitted in some embodiments. In addition, the steps and descriptions described in relation to FIGS. 1-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 and 8-10 could be used to perform one or more of the steps in FIGS. 6, 7 and 11.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within any one vehicle 200 or 300.

The processes discussed above in connection with FIGS. 6, 7, and 11 are intended to be illustrative and not limiting. One skilled in the art would appreciate that the steps of the processes in FIGS. 6, 7, and 11 discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for turning a vehicle, the method comprising:
engaging a first turn mode in response to one or more wheels of the vehicle being turned to a turn angle that is past a first turn threshold, wherein forward torque is applied to a rear wheel of the vehicle in the first turn mode; and
engaging a second turn mode in response to the one or more wheels continuing to be turned to a turn angle that is past a second turn threshold greater than the first turn threshold, wherein forward torque is applied to a front wheel of the vehicle and backward torque is applied to two rear wheels of the vehicle in the second turn mode.

2. The method of claim 1, wherein the rear wheel is an outer rear wheel, the method further comprising providing, while the first turn mode is engaged, backward torque to an inner rear wheel of the vehicle and forward torque to front wheels of the vehicle.

3. The method of claim 1, wherein the two rear wheels comprise an inner rear wheel and outer rear wheel and the rear wheel is the outer rear wheel, the method further comprising, while the first turn mode is engaged:
applying resistance to forward rotation of the inner rear wheel of the vehicle; and
providing forward torque to front wheels of the vehicle.

4. The method of claim 1, wherein the two rear wheels comprise an inner rear wheel and an outer rear wheel, the method further comprising providing, while the second turn mode is engaged:
backward torque to the inner rear wheel and the outer rear wheel wheel of the vehicle; and
forward torque to front wheels of the vehicle.

5. The method of claim 1, further comprising:
monitoring rotation of each of the two rear wheels; and
while the second turn mode is engaged and in response to identifying rear wheel slip in at least one of the two rear wheels, applying a corrective action to the rear wheel exhibiting slip, wherein the corrective action is selected from at least one of applying a brake to the rear wheel exhibiting slip or reducing backward torque to the rear wheel exhibiting slip.

6. The method of claim 4, further comprising:
monitoring rotation of an inner front wheel and an outer front wheel of the front wheels; and
while the second turn mode is engaged, controlling the forward torque of the front wheels such that the rotation of the inner front wheel is approximately equal to the rotation of the outer front wheel.

7. The method of claim 4, further comprising:
monitoring rotation of an inner front wheel and an outer front wheel of the front wheels;
comparing the rotation of the inner front wheel and the outer front wheel to a target spin rate; and
controlling the forward torque to the front wheels based on the comparison.

8. The method of claim 4, wherein while the second turn mode is engaged:
the forward torque causes front forces to be exerted on a ground by the front wheels;
the front forces comprise forward force components and lateral force components;
the backward torque causes rearward force components to be exerted on the ground by the two rear wheels; and
a sum of the forward force components is substantially equal to a sum of the rearward force components.

9. The method of claim 4, further comprising:
receiving rotation information of the vehicle from at least one sensor;
receiving a throttle input; and
while the second turn mode is engaged, controlling the forward torque to the front wheels and the backward torque to the two rear wheels based on the rotation information and the throttle input.

10. The method of claim 4, wherein:
providing forward torque to the front wheels comprises using a first motor configured to transmit torque to an outer front wheel of the front wheels and a second motor configured to transmit torque to an inner front wheel of the front wheels; and providing backward torque to the two rear wheels comprises using a third motor configured to transmit torque to the outer rear wheel of the two rear wheels and a fourth motor configured to transmit torque to the inner rear wheel of the two rear wheels.

11. The method of claim 1, further comprising:

while the first turn mode is engaged, providing forward torque to front wheels of the vehicle such that rotation of an inner front wheel is less than rotation of an outer front wheel; and while the second turn mode is engaged, providing forward torque to the front wheels of the vehicle such that the rotation of the inner front wheel is approximately equal to the rotation of the outer front wheel.

12. A vehicle configured for turning, the vehicle comprising:

two front wheels;

at least one first motor configured to provide torque to the two front wheels;

two rear wheels;

at least one second motor configured to provide torque to the two rear wheels; and control circuitry configured to:

engage a first turn mode in response to one or more wheels among the two front wheels or the two rear wheels being turned to a turn angle that is past a first turn threshold;

while the first turn mode is engaged, control the at least one second motor to provide forward torque to one of the two rear wheels;

engage a second turn mode in response to the one or more wheels continuing to be turned to a turn angle that is past a second turn threshold greater than the first turn threshold; and while the second turn mode is engaged:

control the at least one first motor to provide forward torque to one of the two front wheels; and control the at least one second motor to provide backward torque to the two rear wheels.

13. The vehicle of claim 12, wherein the one of the two rear wheels is an outer rear wheel and wherein the control circuitry is further configured, while the first turn mode is engaged, to:

control the at least one first motor to provide forward torque to the two front wheels; and control the at least one second motor to provide backward torque to an inner rear wheel of the two rear wheels.

14. The vehicle of claim 12, wherein the two rear wheels comprise an inner rear wheel and an outer rear wheel and the one of the two rear wheels is the outer rear wheel and wherein the control circuitry is further configured, while the second turn mode is engaged, to:

control the at least one first motor to provide forward torque to the two front wheels; and control the at least one second motor to provide backward torque to the inner rear wheel and the outer rear wheel of the two rear wheels.

15. The vehicle of claim 14, wherein:

the at least one second motor comprises a first rear motor and a second rear motor; and the control circuitry is configured to control the at least one second motor to provide backward torque to the two rear wheels by:

providing the backward torque to the outer rear wheel using the first rear motor; and providing the backward torque to the inner rear wheel using the second rear motor.

16. The vehicle of claim 12, further comprising:

a front differential mechanically coupled to the at least one first motor and the two front wheels, wherein the at least one first motor provides torque to the two front wheels via the front differential; and a rear differential mechanically coupled to the at least one second motor and the two rear wheels, wherein the at least one second motor provides torque to the two rear wheels via the rear differential.

17. The vehicle of claim 12, wherein the control circuitry is configured to:

control the at least one first motor to provide forward torque to the two front wheels, the at least one first motor comprising a first front motor configured to transmit torque to an outer front wheel and a second front motor configured to transmit torque to an inner front wheel; and control the at least one second motor to provide backward torque to the two rear wheels, the at least one second motor comprising a third rear motor configured to transmit torque to an outer rear wheel and a fourth rear motor configured to transmit torque to an inner rear wheel.

18. A non-transitory computer-readable medium having instructions encoded thereon that, when executed by control circuitry of a vehicle comprising front wheels and rear wheels, cause the control circuitry to:

engage a first turn mode in response to the front wheels being turned to a turn angle that is past a first turn threshold, wherein forward torque is applied to a rear wheel of the vehicle in the first turn mode; and engage a second turn mode in response to the front wheels continuing to be turned to a turn angle that is past a second turn threshold greater than the first turn threshold, wherein forward torque is applied to a front wheel of the vehicle and backward torque is applied to two rear wheels of the vehicle in the second turn mode.

19. The non-transitory computer-readable medium of claim 18, wherein the rear wheel is an outer rear wheel and wherein the instructions further cause the control circuitry, while the first turn mode is engaged, to:

provide backward torque to an inner rear wheel of the two rear wheels; and provide forward torque to the front wheels.

20. The non-transitory computer-readable medium of claim 18, wherein the two rear wheels comprise an inner rear wheel and an outer rear wheel and the rear wheel is the outer rear wheel and wherein the instructions further cause the control circuitry, while the second turn mode is engaged, to provide backward torque to the inner rear wheel and the outer rear wheel of the two rear wheels; and provide forward torque to the front wheels.

* * * * *